US008947724B2

(12) United States Patent
Yokozawa et al.

(10) Patent No.: US 8,947,724 B2
(45) Date of Patent: Feb. 3, 2015

(54) IMAGE CAPTURING UNIT, COLOR MEASURING DEVICE, IMAGE FORMING DEVICE, COLOR MEASURING SYSTEM, AND COLOR MEASURING METHOD

(71) Applicants: Suguru Yokozawa, Kanagawa (JP); Nobuyuki Satoh, Kanagawa (JP); Yasuyuki Suzuki, Kanagawa (JP); Masato Kobayashi, Kanagawa (JP); Yuichi Sakurada, Tokyo (JP); Mamoru Yorimoto, Kanagawa (JP); Tatsuhiko Okada, Saitama (JP); Daisaku Horikawa, Saitama (JP); Masahiro Shigemoto, Saitama (JP); Kazushi Takei, Tokyo (JP); Hideaki Suzuki, Kanagawa (JP); Satoshi Iwanami, Kanagawa (JP)

(72) Inventors: Suguru Yokozawa, Kanagawa (JP); Nobuyuki Satoh, Kanagawa (JP); Yasuyuki Suzuki, Kanagawa (JP); Masato Kobayashi, Kanagawa (JP); Yuichi Sakurada, Tokyo (JP); Mamoru Yorimoto, Kanagawa (JP); Tatsuhiko Okada, Saitama (JP); Daisaku Horikawa, Saitama (JP); Masahiro Shigemoto, Saitama (JP); Kazushi Takei, Tokyo (JP); Hideaki Suzuki, Kanagawa (JP); Satoshi Iwanami, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/780,340

(22) Filed: Feb. 28, 2013

(65) Prior Publication Data
US 2013/0229671 A1  Sep. 5, 2013

(30) Foreign Application Priority Data

Mar. 1, 2012 (JP) ................................. 2012-045960
Mar. 28, 2012 (JP) ................................. 2012-073981
Feb. 19, 2013 (JP) ................................. 2013-030374

(51) Int. Cl.
| | |
|---|---|
| H04N 1/00 | (2006.01) |
| H04N 1/028 | (2006.01) |
| H04N 1/48 | (2006.01) |
| G06F 3/00 | (2006.01) |
| H04N 1/60 | (2006.01) |

(52) U.S. Cl.
CPC .......... *H04N 1/6033* (2013.01); *H04N 1/00045* (2013.01); *H04N 1/0087* (2013.01); *H04N 1/0009* (2013.01); *H04N 1/0282* (2013.01)
USPC ............. 358/1.6; 358/504; 358/505; 358/509

(58) Field of Classification Search
None
See application file for complete search history.

(56) References Cited

U.S. PATENT DOCUMENTS

| | | | | |
|---|---|---|---|---|
| 5,278,674 | A * | 1/1994 | Webb et al. | .................... 358/475 |
| 6,229,137 | B1 * | 5/2001 | Bohn | ............................. 250/234 |
| 6,424,433 | B1 * | 7/2002 | Miyauchi et al. | ............. 358/471 |
| 2003/0150719 | A1 | 8/2003 | Sawa | |
| 2011/0032580 | A1 * | 2/2011 | Yi | ................................. 358/406 |
| 2012/0069411 | A1 | 3/2012 | Satoh et al. | |

(Continued)

FOREIGN PATENT DOCUMENTS
| | | |
|---|---|---|
| JP | 3129502 | 11/2000 |
| JP | 2002-290757 | 10/2002 |

(Continued)

OTHER PUBLICATIONS

U.S. Appl. No. 13/687,520, filed Nov. 28, 2012, Satoh, et al.

*Primary Examiner* — Scott A Rogers
(74) *Attorney, Agent, or Firm* — Oblon, Spivak, McClelland, Maier & Neustadt, L.L.P.

(57) ABSTRACT

An image capturing unit includes a sensor section that images a predetermined range including a subject; a reference chart section that is imaged by the sensor section with the subject; and an illumination light source that illuminates the subject and the reference chart section. The illumination light source is arranged at a position where a mirror reflection region that mirror reflects light entering from the illumination light source to the sensor section is outside a region of the subject and the reference chart section.

11 Claims, 25 Drawing Sheets

(56) References Cited

U.S. PATENT DOCUMENTS

| | | |
|---|---|---|
| 2013/0027720 A1 | 1/2013 | Satoh |
| 2013/0027721 A1 | 1/2013 | Kobayashi et al. |

FOREIGN PATENT DOCUMENTS

| | | |
|---|---|---|
| JP | 2003-032445 | 1/2003 |
| JP | 2006-186846 | 7/2006 |
| JP | 3848882 | 9/2006 |
| JP | 2007-082004 | 3/2007 |
| JP | 2007-255973 | 10/2007 |
| JP | 2008-283375 | 11/2008 |
| JP | 2009-126058 | 6/2009 |
| JP | 2009-239419 | 10/2009 |
| JP | 2012-063270 | 3/2012 |

* cited by examiner

| PATCH NUMBER | Rd | Gd | Bd | Ld | ad | bd | xd | yd | zd |
|---|---|---|---|---|---|---|---|---|---|
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| ... | | | | | | | | | |
| 72 | | | | | | | | | |

Rd Gd Bd columns are labeled: INITIAL REFERENCE RGB VALUE RdGdBd (125). Table labeled MEMORY TABLE Tb1.

IMAGE CAPTURING UNIT, COLOR MEASURING DEVICE, IMAGE FORMING DEVICE, COLOR MEASURING SYSTEM, AND COLOR MEASURING METHOD

CROSS-REFERENCE TO RELATED APPLICATIONS

The present application claims priority to and incorporates by reference the entire contents of Japanese Patent Application No. 2012-45960 filed in Japan on Mar. 1, 2012, Japanese Patent Application No. 2012-73981 filed in Japan on Mar. 28, 2012 and Japanese Patent Application No. 2013-030374 filed in Japan on Feb. 19, 2013.

BACKGROUND OF THE INVENTION

1. Field of the Invention

The present invention relates to an image capturing unit, a color measuring device, an image forming device, a color measuring system and a color measuring method.

2. Description of the Related Art

An image forming device such as a color ink injection image forming device, a color electrophotography image forming device, and the like is used in offset printing of advertising media, pamphlets, and the like in which the number of print copies are relatively few but in which high quality image is demanded with improvement in image quality.

In the offset printing in which high quality is demanded, the color of the printed material demanded by a customer and the color of the print output result that is actually printed and output by the image forming device sometimes differ.

The customer normally checks the color of the printed material on a display and then orders the print, but the image forming device has a color reproducing property unique to each model and may provide a printing result different from the color checked on the display.

A technique of performing color reproduction using a color space, for example, the L*a*b* color space and the xyz color space that does not depend on the device such as the display and the image forming device is thus used from the related art.

The image forming device controls the amount of color material, and the like to output a specified color. For example, in the ink injection image forming device, the discharging amount of ink, the print pattern, and the like are calculation controlled, where the discharging amount of ink from the ink head is controlled to control of the output color. In the electrophotography image forming device, the attaching amount of toner to a photosensitive element, the light quantity of the laser beam, and the like are controlled to control the output color.

However, the amount of color material, for example, the discharging amount of ink in the ink injection image forming device fluctuates according to the state of the nozzle of the head, viscosity fluctuation of the ink, fluctuation of the discharge drive element (piezo element, etc.), and hence causes fluctuation in color reproducibility. Furthermore, the discharging amount of ink in the ink injection image forming device may change over time in one image forming device or may differ for each image forming device, and hence the color reproduction of the image may fluctuate for every image forming device.

In the image forming device, therefore, color adjustment processing is conventionally carried out to suppress the fluctuation of output due to the properties unique to the device and enhance the reproducibility of the output with respect to the input. In the color adjustment processing, for example, an image (reference color patch image) of a color patch of a reference color is actually output by the image forming device, and the reference color patch image is performed with color measurement by the color measuring device. A color conversion parameter is generated based on a difference between a color measurement value of the reference color patch image, which is performed with color measurement by the color measuring device, and a color value in a standard color space of the corresponding reference color, and such color conversion parameter is set to the image forming device. Thereafter, when outputting an image corresponding to the image data, the image forming device performs color conversion on the input image data based on the set color conversion parameter, and records and outputs the image based on the image data of after the color conversion is performed to suppress the fluctuation in the output caused by the properties unique to the device and achieve the image output of high color reproducibility.

In the conventional color adjustment processing, spectrophotometric color measuring device is widely used as a color measuring device for performing color measurement on the reference color patch image, which spectrophotometric color measuring device can obtain spectral reflectivity for every wavelength and thus can carry out highly accurate color measurement. However, the spectrophotometric color measuring device is an expensive device mounted with a great number of sensors, and thus highly accurate color measurement is desired to be carried out using a less expensive device.

Conventionally, there is provided a color measuring device including a reference color measuring unit for performing color measurement on a reference color chart in advance to obtain a hue reference value with RGB data, a color image input unit for obtaining the RGB data by imaging a subject including the reference color chart and a body to be performed with color measurement simultaneously or separately, an image extracting unit for extracting the RGB data of the reference color chart and the RGB data of the body to be performed with color measurement from the RGB data obtained by the color image input unit, and a calculation unit for obtaining a difference between the RGB data of the reference color chart obtained by the image extracting unit and the RGB data of the reference color chart obtained with the reference color measuring unit, and correcting at least the RGB data of the body to be performed with color measurement using the difference (see Japanese Patent Application Laid-open No. H5-223642). In the related art, the reference color chart, which serves as a comparison target of the subject, is placed near the subject to be performed with color measurement, the subject and the reference color chart are simultaneously imaged with a color video camera serving as the color image input unit, the RGB data of the subject is corrected using the RGB data of the reference color chart obtained by the imaging, and then the RGB data of the subject is converted to a color value in the standard color space.

However, in the related art described in Japanese Patent Application Laid-open No. H5-223642, the position relationship between the subject, the reference color chart, and the color video camera is difficult to maintain constant, and the image capturing conditions change for every imaging and stable imaging may not be carried out.

Therefore, there is a need for an image capturing unit, a color measuring device, an image forming device, a color measuring system, and a color measuring method capable of performing stable imaging.

SUMMARY OF THE INVENTION

According to an embodiment, an image capturing unit that includes a sensor section, a reference chat section, and an illumination light source. The sensor section images a predetermined range including a subject. The reference chart section is imaged by the sensor section with the subject. The illumination light source illuminates the subject and the reference chart section. The illumination light source is arranged at a position where a mirror reflection region that mirror reflects light entering from the illumination light source to the sensor section is outside a region of the subject and the reference chart section.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, preferred embodiments of the present invention will be described in detail based on the accompanied drawings. The embodiments described below are preferred embodiments of the present invention, and hence have technically preferred various limitations, but the scope of the invention is not to be wrongly limited by the following description and all configurations described in the present embodiment are not to be considered as essential configuring elements of the present invention.

"Lab (Lab value)" described below refers to, for example, CIELAB (CIE 1976 L*a*b*) color space (value thereof). Hereinafter, "L*a*b*" is simply expressed as "Lab" for the sake of convenience of explanation.

[First Embodiment]

Figure 1:
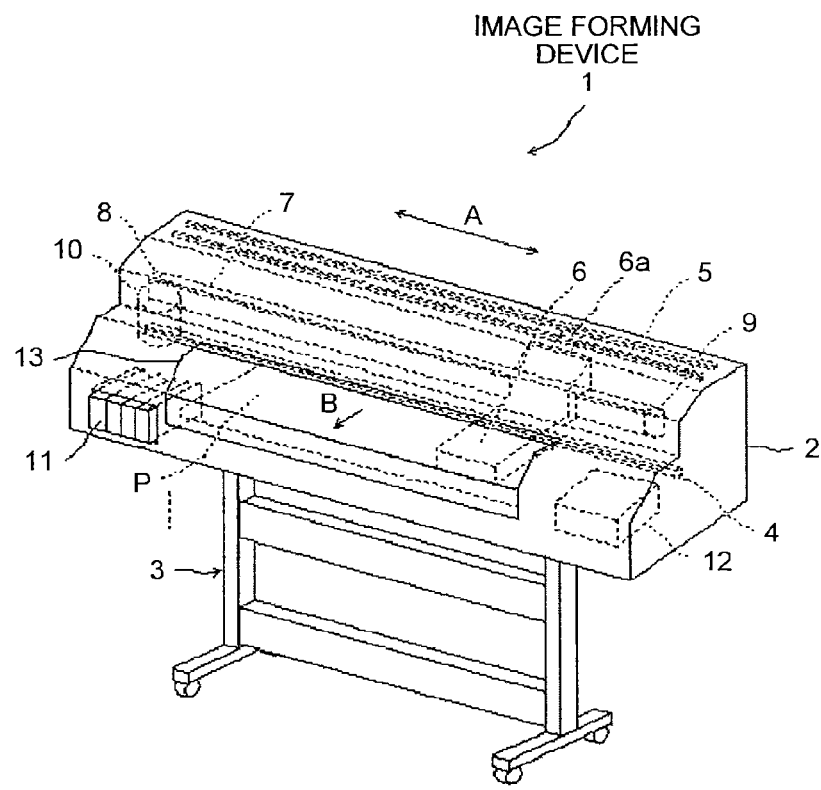
FIG. 1 is a schematic perspective view of an image forming device applied with one embodiment of the present invention.

FIG. 1 to FIG. 28 are views illustrating a first embodiment of an image capturing unit, a color measuring device, an image forming device, a color measuring system, and a color measuring method of the present invention, where FIG. 1 is a schematic perspective view of an image forming device 1 applied with the first embodiment of the image capturing unit, the color measuring device, the image forming device, the color measuring system, and the color measuring method of the present invention.

In FIG. 1, the image forming device 1 has a main body housing 2 arranged on a main body frame 3. A main guide rod 4 and a sub-guide rod 5 are arranged across in a main-scanning direction illustrated with a double headed arrow A in FIG. 1 in the main body housing 2. The main guide rod 4 movably supports a carriage 6. The carriage 6 includes a coupling piece 6a that engages with the sub-guide rod 5 to stabilize the position of the carriage 6.

The image forming device 1 has a timing belt 7 in a form of an endless belt arranged along the main guide rod 4. The timing belt 7 is bridged between a drive pulley 8 and a driven pulley 9. The drive pulley 8 is rotatably driven by a main scanning motor 10. The driven pulley 9 is arranged so as to apply a predetermined tension on the timing belt 7. When the drive pulley 8 is rotatably driven by the main scanning motor 10, the timing belt 7 is rotatably moved in the main-scanning direction according to the rotating direction.

The carriage 6 is coupled to the timing belt 7, and reciprocates in the main-scanning direction along the main guide rod 4 when the timing belt 7 is rotatably moved in the main-scanning direction by the drive pulley 8.

The image forming device 1 has a cartridge unit 11 and a maintaining mechanism unit 12 accommodated at positions on both ends of the main-scanning direction of the main body housing 2. The cartridge unit 11 accommodates cartridges that respectively accommodate each ink of yellow (Y), magenta (M), cyan (C), and black (K) in a replaceable manner. Each cartridge of the cartridge unit 11 is coupled to a print head $20y$, $20m$, $20c$, $20k$ (see FIG. 2) of a corresponding color of a print head 20 mounted on the carriage 6 with a pipe (not illustrated). Each cartridge supplies ink to the corresponding print head $20y$, $20m$, $20c$, $20k$ through the pipe. In the following description, the print heads $20y$, $20m$, $20c$, $20k$ are collectively referred to as the print head 20.

As will be described later, the image forming device 1 discharges ink onto a recording medium P, which is intermittently conveyed in a sub-scanning direction (see arrow B of FIG. 1) orthogonal to the main-scanning direction on a platen 14 (see FIG. 2), while moving the carriage 6 in the main-scanning direction to record and output an image onto the recording medium P.

In other words, the image forming device 1 of the present embodiment intermittently conveys the recording medium P in the sub-scanning direction, and discharges the ink onto the recording medium P on the platen 14 from a nozzle row of the print head 20 mounted on the carriage 6 while moving the carriage 6 in the main-scanning direction while the conveyance of the recording medium P in the sub-scanning direction is stopped to form the image on the recording medium P.

The maintaining mechanism unit 12 performs cleaning of a discharging surface of the print head 20, capping, discharging of unnecessary ink, and the like, to discharge the unnecessary ink from the print head 20 and maintain the reliability of the print head 20.

The image forming device 1 includes a cover 13 capable of opening and closing a conveying portion of the recording medium P. Tasks such as maintenance task of the inside of the main body housing 2, removal of jammed recording medium P, and the like can be carried out by opening the cover 13 at the time of maintenance and at the time of occurrence of jam of the image forming device 1.

Figure 2:
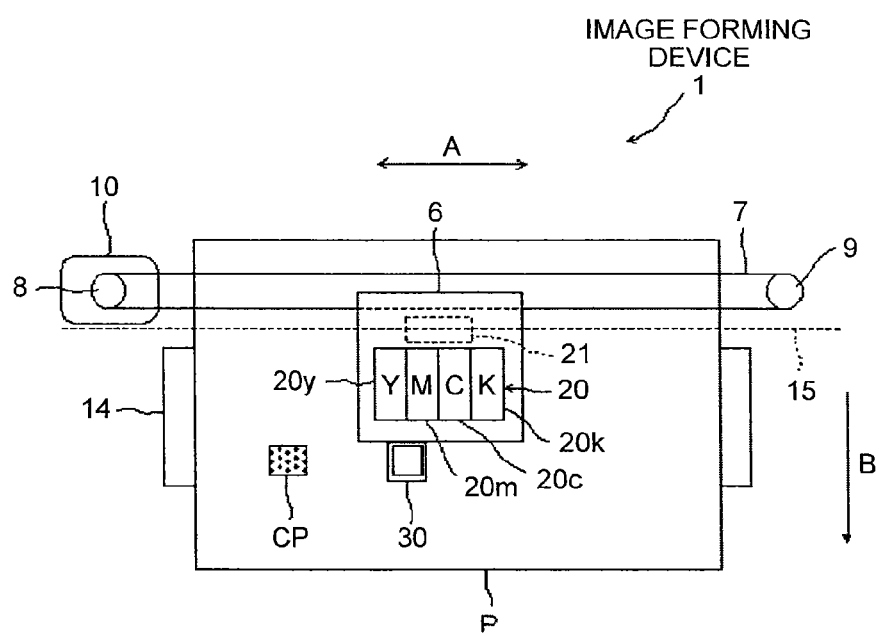
FIG. 2 is a plan view of a carriage portion.

As illustrated in FIG. 2, the carriage 6 is mounted with the print heads $20y$, $20m$, $20c$, and $20k$. The print heads $20y$, $20m$, $20c$, and $20k$ are respectively coupled to a cartridge of a corresponding color of the cartridge unit 11 with a pipe to discharge the ink of the corresponding color to the opposing recording medium P. In other words, the print head $20y$ discharges yellow (Y) ink, the print head $20m$ discharges magenta (M) ink, the print head $20c$ discharges cyan (C) ink, and the print head $20k$ discharges black (K) ink.

The print head 20 is mounted on the carriage 6 such that the discharging surface (nozzle surface) faces the lower side in FIG. 1 (toward recording medium P), and discharges the ink onto the recording medium P.

The image forming device 1 includes an encoder sheet 15 over at least a moving range of the carriage 6 in parallel to the timing belt 7, that is, the main guide rod 4. An encoder sensor 21 for reading the encoder sheet 15 is attached to the carriage 6. The image forming device 1 controls the drive of the main scanning motor 10 based on the reading result of the encoder sheet 15 by the encoder sensor 21 to control the movement in the main-scanning direction of the carriage 6.

Figure 3:
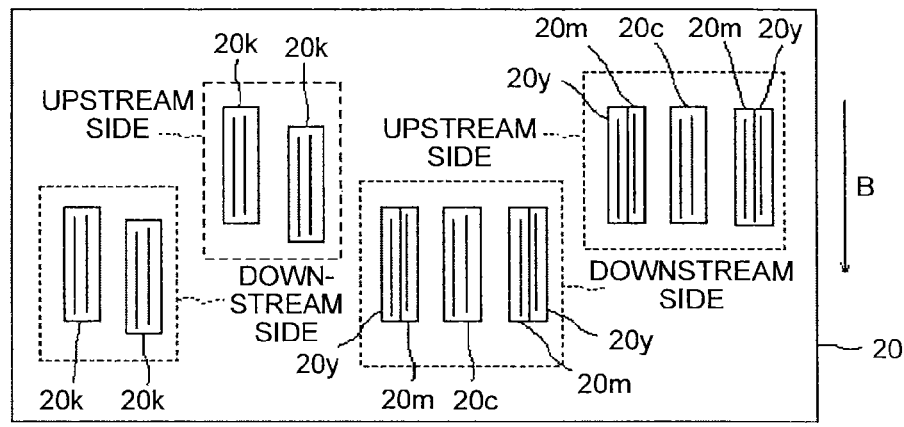
FIG. 3 is an arrangement view of a print head.

As illustrated in FIG. 3, the print head 20 mounted on the carriage 6 has each print head $20y$, $20m$, $20c$, $20k$ configured by a plurality of nozzle rows. The ink is discharged from the nozzle row onto the recording medium P conveyed on the platen 14 to form an image on the recording medium P. In the image forming device 1, an upstream print head 20 and a downstream print head 20 are mounted on the carriage 6 to ensure a wide width of the image that can be formed on the recording medium P with one scanning of the carriage 6. Furthermore, the print head 20 is mounted on the carriage 6 by a number twice the number of the print heads $20y$, $20m$, $20c$ that discharge color ink to enhance the black printing speed. The print heads $20y$, $20m$ are divided in the main-scanning direction and arranged in an adjacent state to match the order of overlapping the color in the reciprocating operation of the carriage 6 so that the color does not change between outward and return. The arrangement of each print head $20y$, $20m$, $20c$, and $20k$ of the print head 20 is not limited to the arrangement illustrated in FIG. 3.

As illustrated in FIG. 2, an image capturing unit (image capturing device) 30 is attached to the carriage 6. The image capturing unit 30 captures an image of a subject to perform color measurement on the subject (object to be performed with color measurement) at the time of color adjustment processing to be described later.

Figure 4:
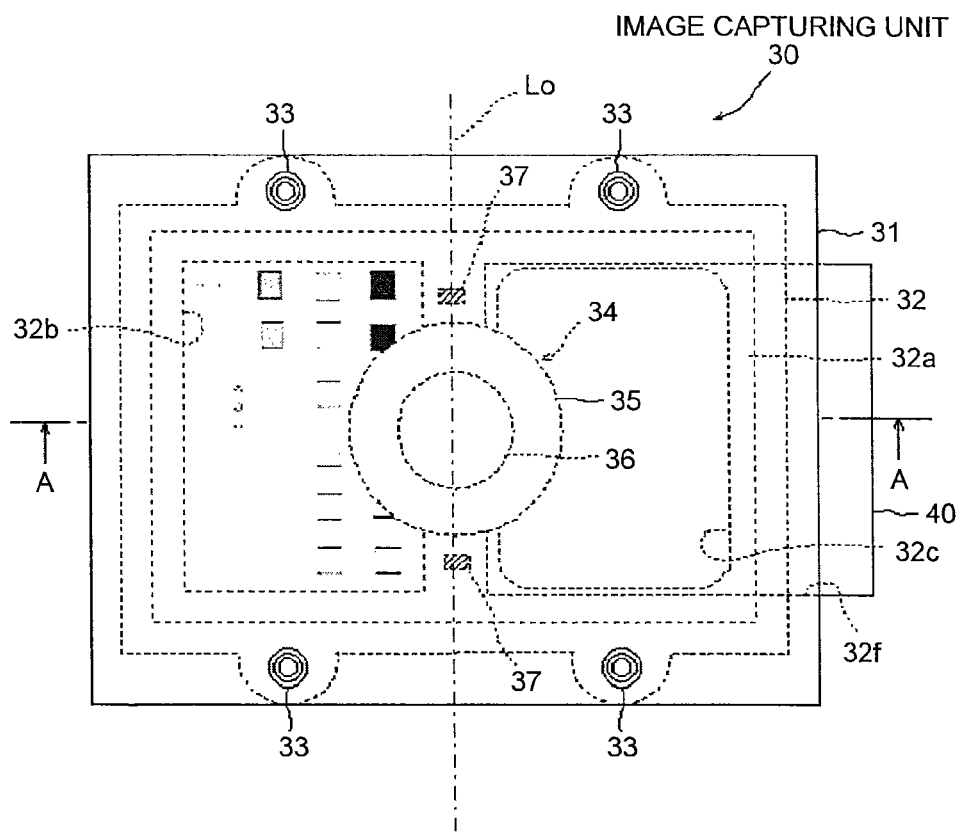
FIG. 4 is a plan view of an image capturing unit.
Figure 5:
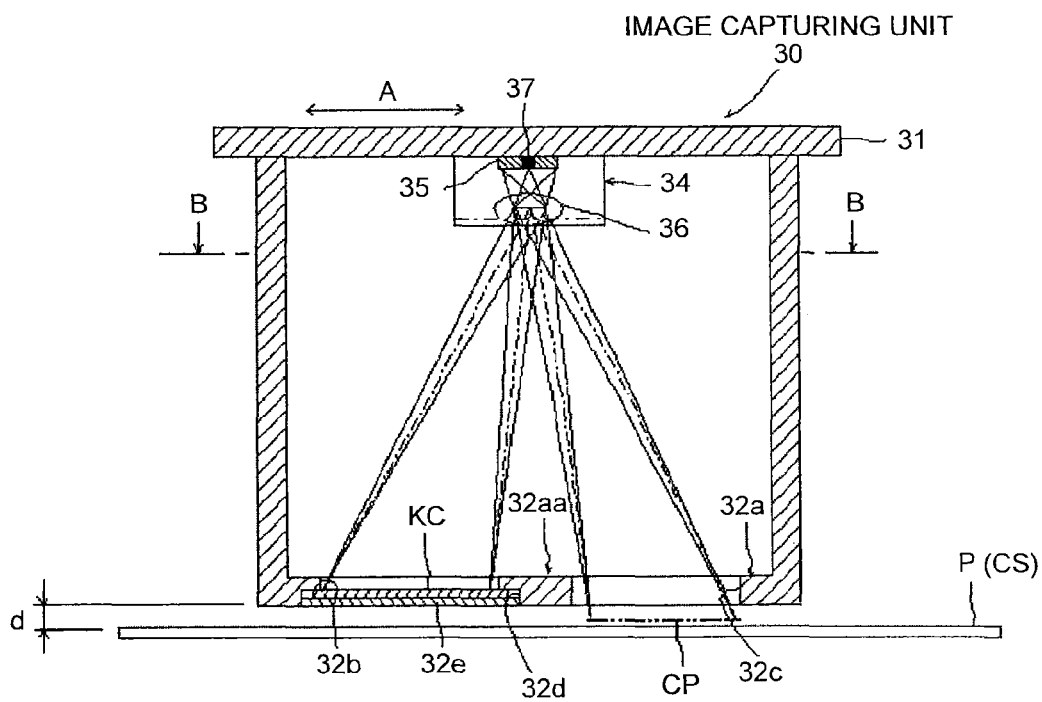
FIG. 5 is a cross-sectional view taken in the direction of arrow A-A of the image capturing unit of FIG. 4.
Figure 6:
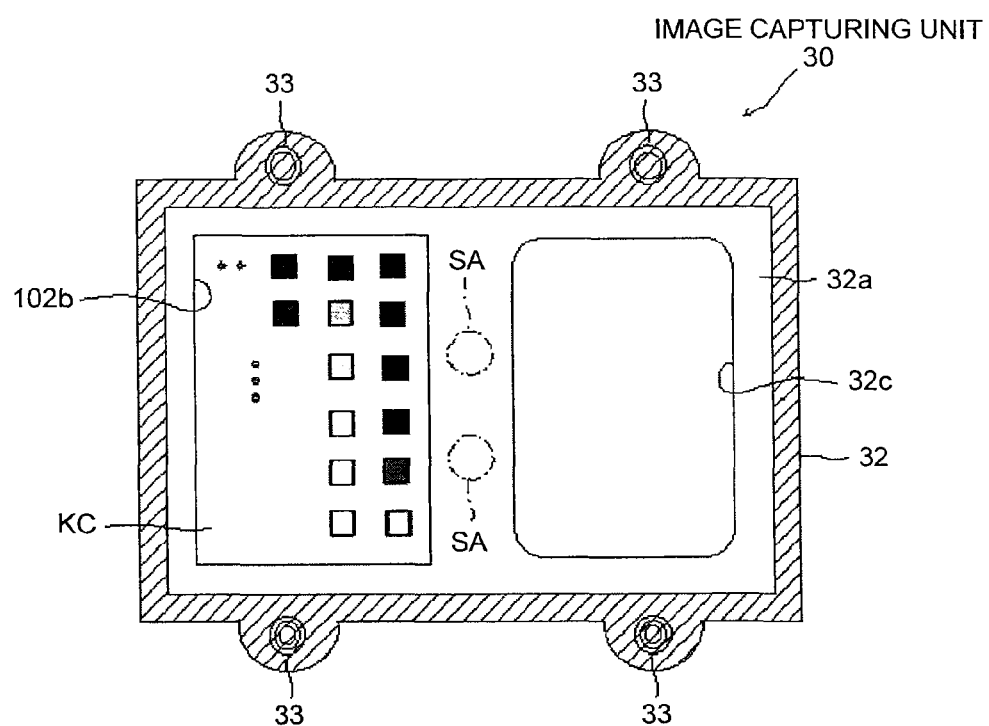
FIG. 6 is a cross-sectional view taken in the direction of arrow B-B of the image capturing unit of FIG. 5.
Figure 7:
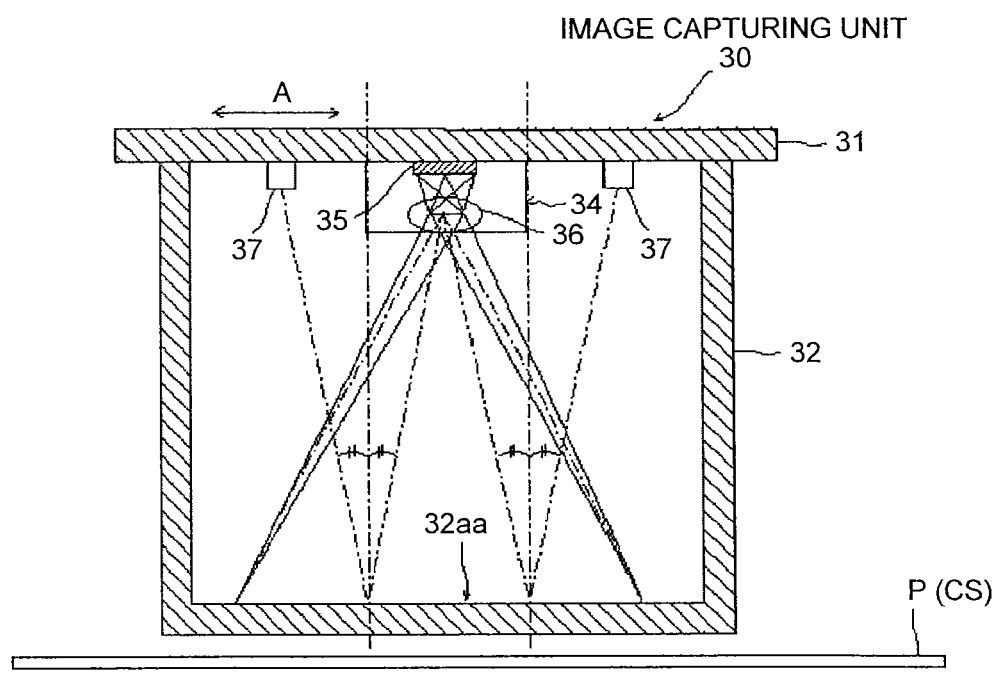
FIG. 7 is a cross-sectional view taken in the direction of arrow C-C of the image capturing unit of FIG. 4.

As illustrated in FIG. 4, which is a plan view, FIG. 5, which is a cross-sectional view taken in the direction of arrow A-A of FIG. 4, FIG. 6, which is a cross-sectional view taken in the direction of arrow B-B of FIG. 5, and FIG. 7, which is a cross-sectional view taken in the direction of arrow of FIG. 4, the image capturing unit 30 has a square box-shaped frame body 32 in which a surface on a substrate 31 side is opened fixed to the substrate 31 by a fastening member (not illustrated). The substrate 31 is fixed to the carriage 6 illustrated in FIG. 1. The frame body 32 is not limited to a square shape, and for example, may be a cylindrical box shape or an elliptic tube shaped box shape having the bottom surface portion $32a$ in which the openings $32b$, $32c$ are formed.

The image capturing unit 30 has an image sensor section 34 arranged at a central part of the surface on the frame body 32 side of the substrate 31. The image sensor section (sensor section) 34 includes a two-dimensional image sensor 35 such as a CCD (Charge Coupled Device) sensor, a CMOS (Complimentary Metal Oxide Semiconductor) sensor and the like, and a lens 36.

In the image capturing unit 30, the frame body 32 is attached to the carriage 6 with the lower surface of the surface portion (hereinafter referred to as bottom surface portion) $32a$ on the side opposite to the substrate 31 facing the recording medium P on the platen 14 with a predetermined spacing d. The bottom surface portion (opposing surface) $32a$ is formed with substantially rectangular opening $32b$ and opening $32c$ in the main-scanning direction, with a center line Lo as a center, with a bottom surface portion $32aa$ for absorbing mirror reflection of a predetermined width in between. The bottom surface portion $32aa$ may be performed with predetermined surface treatment and the like to absorb the mirror reflection.

As will be described later, the spacing d is preferably small in view of a focal length with respect to a two-dimensional image sensor 35. It is set to a size the lower surface of the frame body 32 and the recording medium P do not contact, for example, about 1 mm to 2 mm according to the relationship with the planarity of the recording medium P.

As will be described later, the opening $32c$ is used to capture the image of a reference color patch KP (see FIG. 10) of a reference sheet KS (see FIG. 10), which is an imaging target body (subject) formed on the recording medium P, and a color measurement adjustment color patch CP (see FIG. 5)

of a color measurement adjustment sheet CS (see FIG. 5). The opening 32c is to be at least a size at which all the images to be imaged can be imaged. The opening 32c is formed to an open state slightly larger than the size of the image capturing region to be imaged in view of the shadow that forms around the opening 32c due to the spacing d between the frame body 32 and the imaging target.

The opening 32b is formed with a recess 32d of a predetermined width along the periphery of the opening 32b on the surface on the recording medium P side. The reference chart KC is removably attached to the recess 32d. A holding plate 32e for holding the reference chart KC in the recess 32d while covering the surface on the recording medium P side of the reference chart KC is removably attached to the recess 32d of the opening 32b of the frame body 32. The opening 32b is closed by the reference chart KC and the holding plate 32e. The holding plate 32e has the surface on the recording medium P side formed to a smooth flat surface.

The reference chart KC is photographed at the same time as the reference color patch KP and the color measurement adjustment color patch CP by the image capturing unit 30 as a comparison target with an image capturing color measurement value of the reference color patch KP of the reference sheet KS and the color measurement adjustment color patch CP of the color measurement adjustment sheet CS to be imaged in the color adjustment processing. In other words, the image capturing unit 30 images the references color patch KP of the reference sheet KS positioned outside the frame body 32 and the color measurement adjustment color patch CP of the color measurement adjustment sheet CS through the opening 32c formed in the bottom surface portion 32a of the frame body 32, and at the same time, images the color patch on the reference chart KC attached to the recess 32d formed at the periphery of the opening 32b of the bottom surface portion 32a of the frame body 32 as a comparison target. In the image capturing unit 30, the two-dimensional image sensor 35 sequentially scans the pixels to read the image. In a narrow sense, the image capturing unit 30 does not simultaneously read the reference color patch KP of the reference sheet KS and the color measurement adjustment color patch CP of the color measurement adjustment sheet CS, and the reference chart KC, but can acquire images of the reference color patch KP, the color measurement adjustment color patch CP, and the reference chart KC in one frame, which is hereinafter appropriately expressed as simultaneous acquisition.

Figure 8:
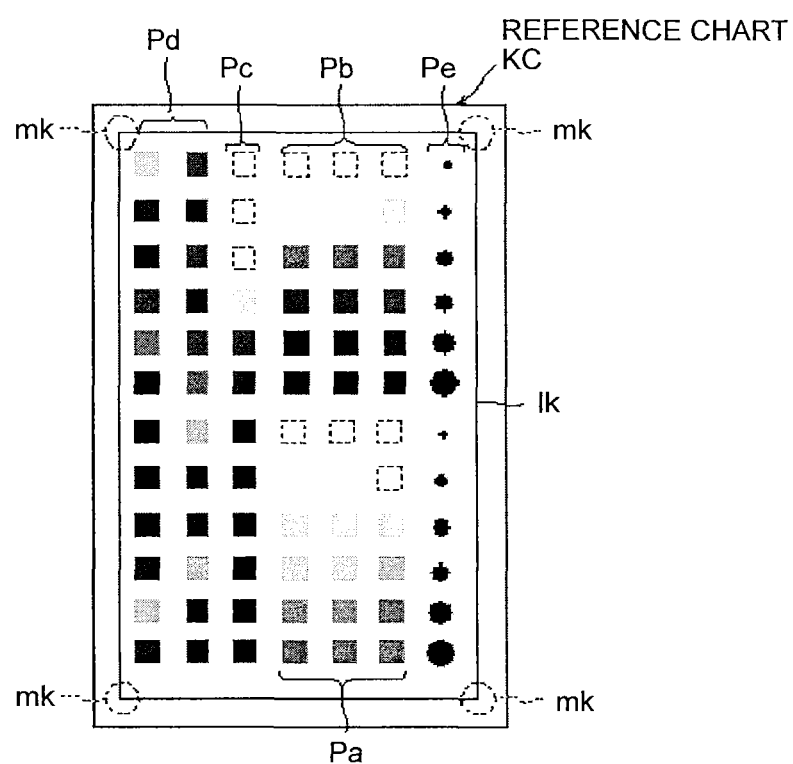
FIG. 8 is a plan view of a reference chart.

As illustrated in FIG. 8, similar to the reference sheet KS described later, the reference chart KC is formed with a plurality of reference color patch rows Pa to Pd for color measurement, a dot diameter measurement pattern row Pe, a distance measurement line lk, and a chart position specifying marker mk on a surface (upper surface) on the interior side of the frame body 32.

The patch rows Pa to Pd for color measurement include the patch row Pa in which color patches of a primary color of YMC are arranged in a hierarchical order, the patch row Pa in which color patches of secondary color of RGB are arranged in hierarchical order, the patch row (chromatic color hierarchical pattern) Pc in which patches of gray scale are arranged in hierarchical order, and the patch row Pd in which patches of teritary color are arrayed. The dot diameter measurement pattern row Pe is a pattern row for measuring geometrical shape in which circular patterns of different sizes are arrayed in the order of size.

The distance measurement line lk is formed as a frame line of a square that surrounds the color measurement patch rows Pa to Pd and the dot diameter measurement pattern row Pe.

The chart position specifying marker mk is a marker arranged at positions of four corners of the distance measurement line lk to specify the position of each patch.

The color measurement control unit 106 (see FIG. 9 and FIG. 10) to be described later specifies the position of the reference chart KC and the position of each pattern by specifying the distance measurement line lk and the chart position specifying markers mk at the four corners thereof from the image data of the reference chart KC acquired from the image capturing unit 30.

Similar to the reference color patch KP of the reference chart KC to be described later, each patch configuring the reference color patch rows Pa to Pd for color measurement has a color value (Lab value) in the Lab color space, which is a standard color space, measured in advance using a spectroscope BS (see FIG. 11). The color value becomes a reference value when performing color measurement on the color measurement adjustment color patch CP of the color measurement adjustment sheet CS to be described later.

The configuration of the patch rows Pa to Pd for color measurement arranged in the reference chart KC is not limited to the arrangement example illustrated in FIG. 7, and an arbitrary patch row can be used. For example, a patch that can widely specify a color range as much as possible may be used, and the patch row Pa of the primary color of YMCK and the patch row Pc of the gray scale may be configured with the patches of the color measurement value of the ink used in the image forming device 1. The patch row Pa of the secondary color of RGB of the reference chart KC may be configured with the patch of the color measurement value that can emit color with the ink used in the image forming device 1, and a reference color chart in which the color measurement value such as Japan Color and the like is defined may be used.

In the present embodiment, the reference chart having the patch row of a shape of a general patch (chart) is used, but the reference chart does not necessarily need to include such patch row. The reference chart merely needs to have a configuration in which a plurality of colors that can be used for color measurement are arranged such that the respective positions can be specified.

The reference chart KC is arranged in the recess 32d formed at the outer periphery of the surface on the recording medium P side of the opening 32b formed in the bottom surface portion 32a of the frame body 32. Thus, the reference chart KC can be imaged with the two-dimensional image sensor 35 of the image sensor section 34 with the focal length similar to the imaging target such as the recording medium P, and the like.

As described above, the reference chart KC is removably set in the recess 32d formed on the outer periphery of the surface on the recording medium P side of the opening 32b formed in the bottom surface portion 32a of the frame body 32, and the surface on the recording medium P side is removably held with the holding plate 32e detachably attached to the recess 32d. Thus even if dust and the like that entered the frame body 32 attaches to the surface of the reference chart KC, the holding plate 32e and the reference chart KC can be detached, and attached again after cleaning the reference chart KC, thus enhancing measurement accuracy of the reference chart KC.

Returning again from FIG. 4 to FIG. 7, the image capturing unit 30 has a pair of illumination light sources 37 arranged on the substrate 31 at positions spaced apart at an equal interval by a predetermined amount in the sub-scanning direction from the image sensor section 34 on the center line Lo of the sub-scanning direction passing through the center of the image sensor section 34. The illumination light source 37 may be an LED (Light Emitting Diode), and the like. The illumination light source 37 is arranged on the center line Lo, that is, immediately above the bottom surface portion 32aa for absorbing mirror reflection. The bottom surface portion 32aa for absorbing mirror reflection is formed to a width wider than a mirror reflection region SA of the illumination light source 37, as illustrated in FIG. 6.

Furthermore, the image capturing unit 30 has the arrangement condition of the opening 32c and the reference chart KC of the image capturing region arranged substantially symmetric to the center line Lo connecting the center of the lens 36 and the illumination light source 37. Thus, the imaging condition of the two-dimensional image sensor 35 may be line symmetric and may be the same, whereby the accuracy in the color adjustment processing and the color measurement processing of the two-dimensional image sensor 35 using the reference chart KC can be enhanced.

Figure 9:
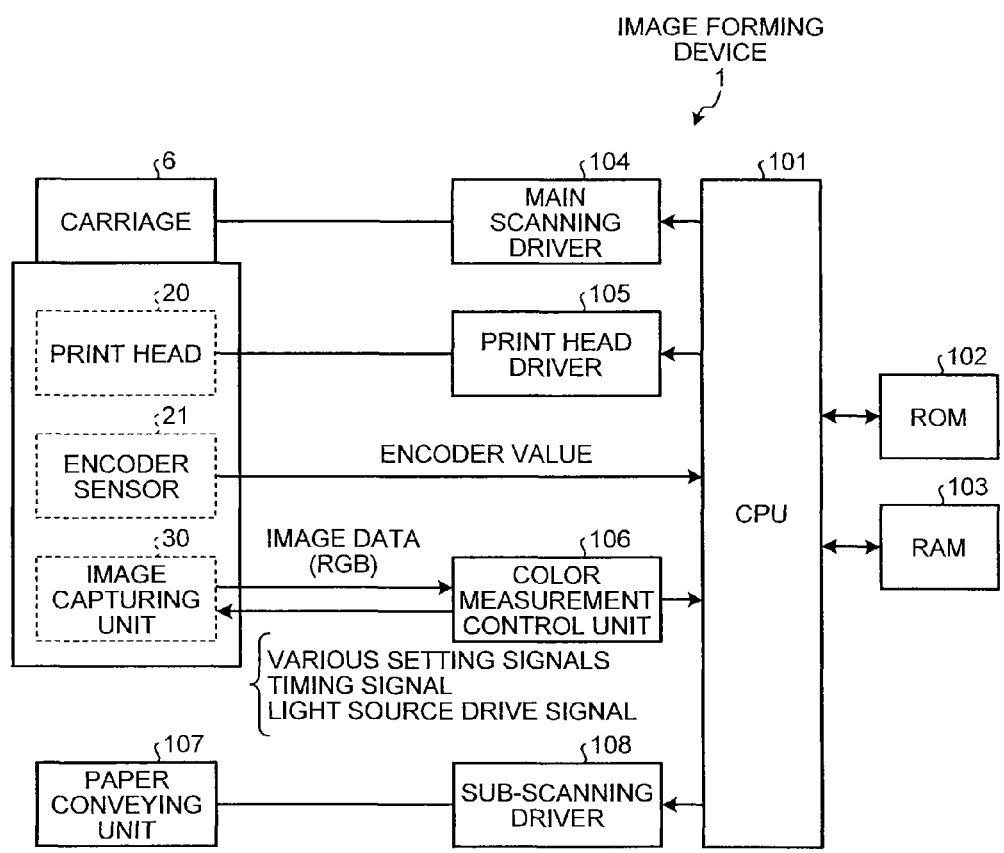
FIG. 9 is a block configuration diagram of the main portion of the image forming device.

The image forming device 1 of the present embodiment is block configured as illustrated in FIG. 9. The image forming device 1 includes a CPU (Central Processing Unit) 101, a ROM (Read Only Memory) 102, a RAM (Random Access Memory) 103, a main scanning driver 104, a print head driver 105, a color measurement control unit 106, a paper conveying unit 107, a sub-scanning driver 108, and the like, and also includes the print head 20 mounted on the carriage 6, the encoder sensor 21, the image capturing unit 30, and the like.

The ROM 102 stores programs such as basic program for the image forming device 1, color adjustment processing program, and the like, as well as necessary system data. The CPU 101 controls each unit of the image forming device 1 while using the RAM 103 as a work memory based on the programs in the ROM 102 to execute the basic processing for the image forming device 1. The CPU 101 also executes the color adjustment processing at the time of forming an image based on the color measurement value obtained with the color measurement processing in the color measurement control unit 106 on the basis of the RGB value imaged by the image capturing unit 30.

In the control of the carriage 6 and the paper conveying unit 107, the CPU 101 controls the drive of the main scanning driver 104 based on an encoder value from the encoder sensor 21 to control the movement of the carriage 6 in the main-scanning direction. The CPU 101 also controls the drive of the sub-scanning motor (not illustrated) and the paper conveying unit 107 such as the conveying roller through the sub-scanning driver 108. The CPU 101 also controls the discharge timing of the ink and the ink discharging amount by the print head 20 through the print head driver 105. The CPU 101 controls the lighting drive of the illumination light source 37 of the image capturing unit 30 through the color measurement control unit 106.

As described above, the image capturing unit 30 images the color measurement adjustment color patch CP formed by the print head 20 on the recording medium P at the time of color measurement, as will be described later, to generate a color measurement value for color adjustment for accurately reproducing the color of the image data of when recording and outputting the image as a color intended by the user, and outputs the imaged RGB value to the CPU 101. In the present embodiment, the color measurement control unit 106 is configured separate from the image capturing unit 30, but the color measurement control unit 106 may be integrally configured with the image capturing unit 30. For example, a control circuit that functions as the color measurement control unit 106 may be mounted on the substrate 31 of the image capturing unit 30.

Figure 10:
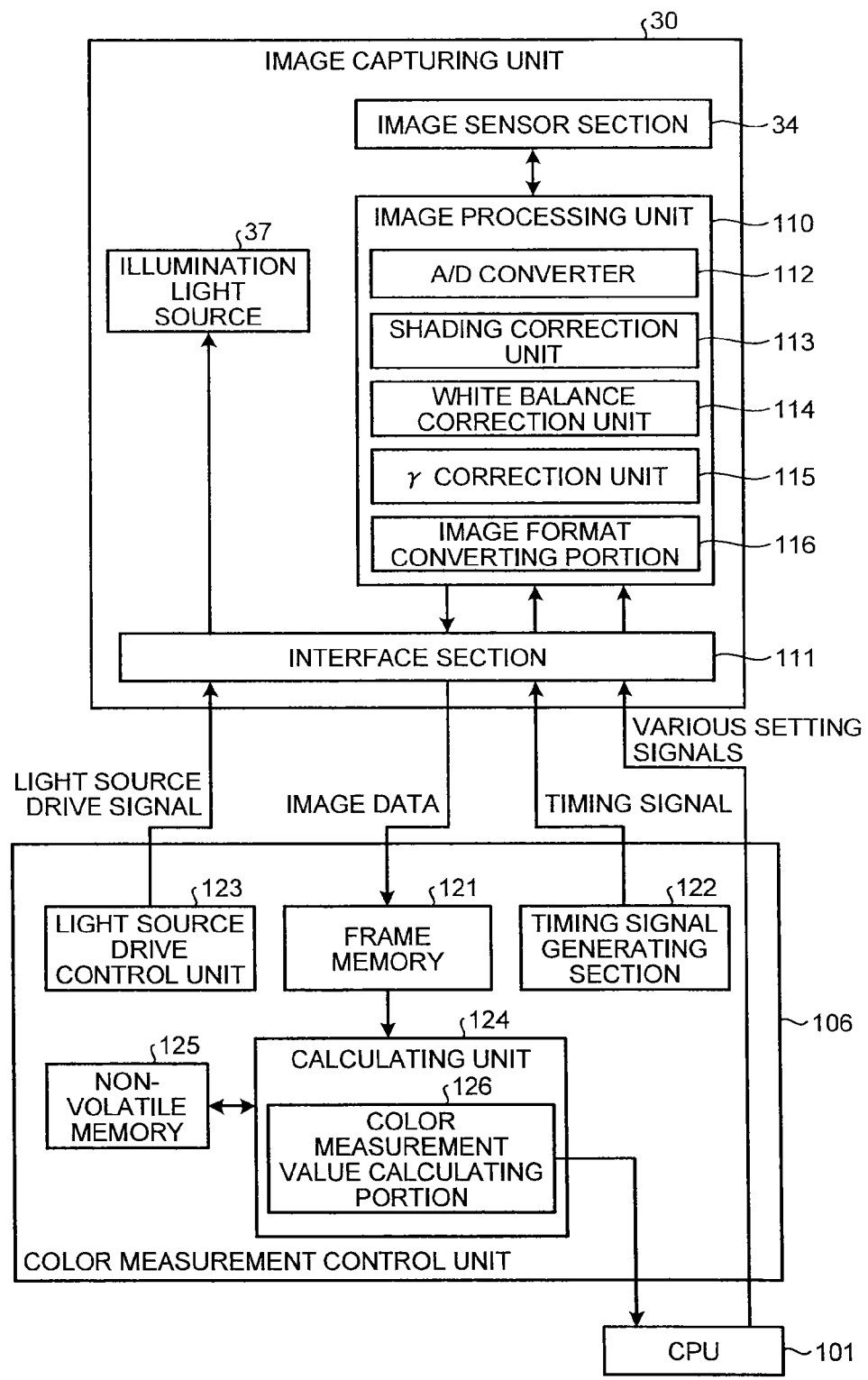
FIG. 10 is a block configuration diagram of the image capturing unit and the color measurement control unit.

The image capturing unit 30 and the color measurement control unit 106 are block configured as illustrated in FIG. 10. The image capturing unit 30 includes the illumination light source 37 and the image sensor section 34, and also includes an image processing unit 110, an interface section 111, and the like. In the present embodiment, the image processing unit 110 is configured separate from the image sensor section 34, but the function of the image processing unit 110 may be provided to the two-dimensional image sensor 35 of the image sensor section 34. The image processing unit 110 includes an A/D converter 112, a shading correction unit 113, a white balance correction unit 114, a γ correction unit 115, and an image format converting portion 116.

The image capturing unit 30 outputs analog RGB image data in which the subject and the reference chart KC are simultaneously imaged by the image sensor section 34 to the image processing unit 110. The image processing unit 110 performs necessary image processing on the analog RGB image data transmitted from the image sensor section 34 and outputs to the color measurement control unit 106.

The A/D converter 112 of the image processing unit 110 converts the analog RGB image data input from the image sensor section 34 to digital data and outputs the same to the shading correction unit 113.

The shading correction unit 113 corrects the error of the image data caused by illuminance unevenness of the illumination light from the illumination light source 37 on the image capturing range of the image sensor section 34 with respect to the RGB image data input from the A/D converter 112, and outputs the result to the white balance correction unit 114.

The white balance correction unit 114 corrects the white balance with respect to the RGB image data performed with the shading correction, and outputs to the γ correction unit 115.

The γ correction unit 115 performs correction so as to compensate the linearity of the sensitivity of the image sensor section 34 with respect to the image data input from the white balance correction unit 114, and outputs to the image format converting portion 116.

The image format converting portion 116 converts the image data performed with the γ correction to an arbitrary format, and outputs to the color measurement control unit 106 through the interface section 111.

The interface section 111 is an interface for the image capturing unit 30 to acquire various setting signals, timing signal, and light source drive signal transmitted from the color measurement control unit 106, and for the image capturing unit 30 to transmit the image data to the color measurement control unit 106.

The color measurement control unit 106 includes a frame memory 121, a timing signal generating section 122, a light source drive control unit 123, a calculating unit 124, and a non-volatile memory 125, which calculating unit 124 includes a color measurement value calculating portion 126.

The frame memory 121 is a memory for temporarily storing the image data transmitted from the image capturing unit 30, and outputs the stored image data to the calculating unit 124.

Figure 11:
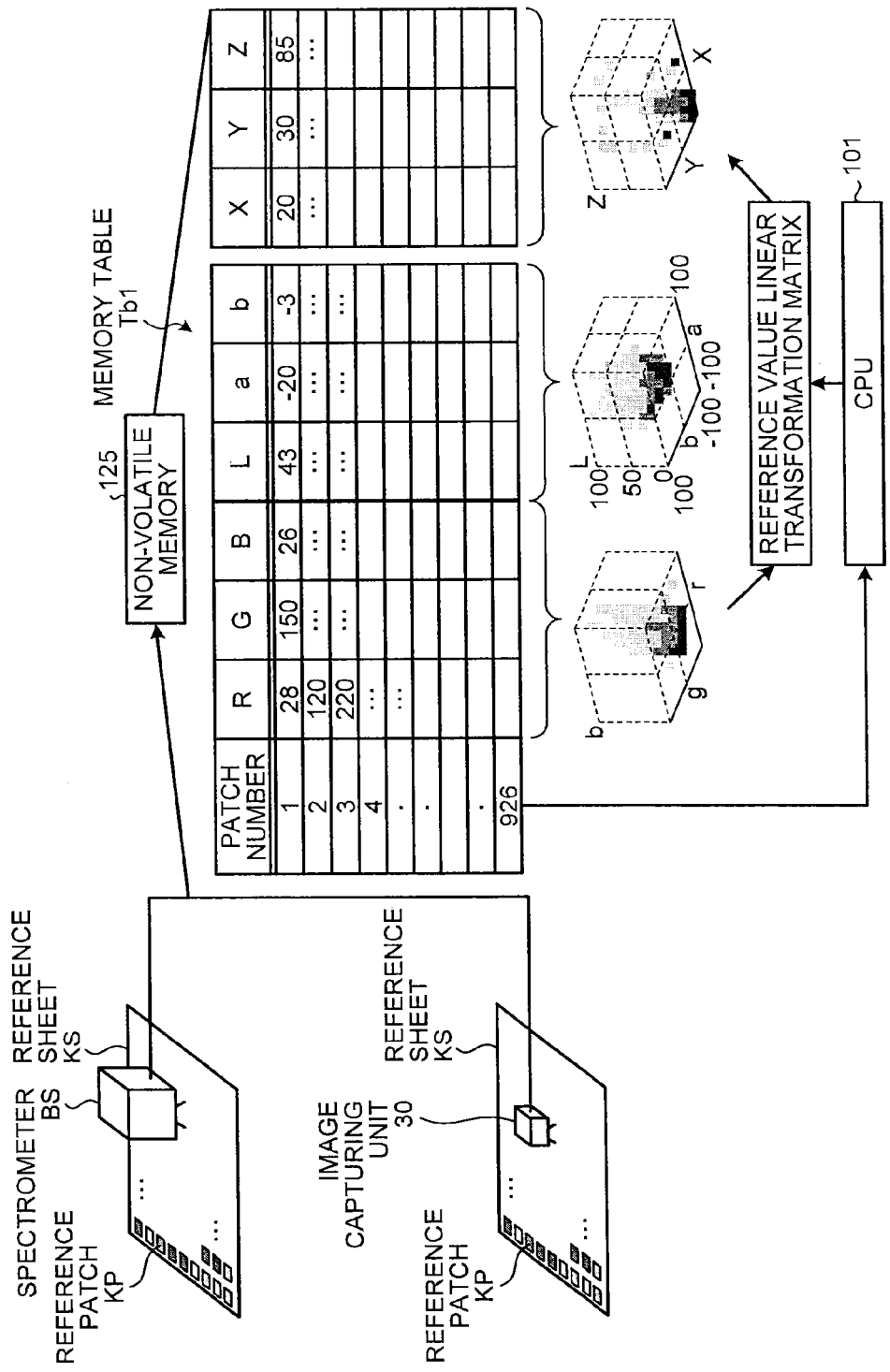
FIG. 11 is an explanatory view of acquiring processing of the reference color measurement value and the imaging reference RGB value from the reference sheet and the reference value linear transformation matrix acquiring processing.

As illustrated in FIG. 11, the non-volatile memory 125 has at least one of (both Lab value and XYZ value in FIG. 11) the Lab value or the XYZ value, which are color measurement values of the color measurement result of a plurality of reference color patches KP formed in an array on the reference sheet KS by the spectroscope (color measuring device) BS stored as a reference color measurement value in correspondence with the patch number in a memory table Tb1 of the non-volatile memory 125.

The image forming device 1 sets the reference sheet KS on the platen 14 of the image forming device in a state the reference color measurement value is stored in the memory table Tb1 of the non-volatile memory 125 and in an initial state of the image forming device 1, controls the movement of the carriage 6 to read the reference color patch KP same as that read with the spectroscope BS in the reference sheet KS with the image capturing unit 30. The image forming device 1 corresponds the read imaging reference RGB value in correspondence with the patch number, that is, stores in correspondence with the reference color measurement value in the memory table Tb1 of the non-volatile memory 125. The image capturing unit 30 acquires the RGB value by imaging each patch of the reference sheet KC, and stores the RGB value of each patch of the reference chart KC as an initial reference RGB value RdGdBd in the memory table Tb1 of the non-volatile memory 125 under the control of the calculating unit 124.

After the reference color measurement value, the imaging reference RGB value, and the initial reference RGB value RdGdBd are stored in the non-volatile memory 125, the color measurement value calculating portion 126 calculates a reference value linear transformation matrix for mutual conversion on the pair of XYZ value of the reference color measurement value and the imaging RGB value stored in the non-volatile memory 125, that is, the pair of XYZ value and the imaging reference RGB value of the same patch number. The color measurement value calculating portion 126 stores the calculated reference value linear transformation matrix in the non-volatile memory 125.

The image forming device 1 executes the above described processing in the initial state, registers the reference color measurement value, the imaging reference RGB value, and the initial reference RGB value RdGdBd, which are the execution results, in the memory table Tb1 of the non-volatile memory 125, and then calculates the reference value linear transformation matrix and stores the same in the non-volatile memory 125.

Furthermore, as will be described later, the image forming device 1 of the present embodiment simultaneously images the color measurement adjustment color patch CP and the reference chart KC arranged inside the frame body 32, which serve as the subject formed on the recording medium P by the print head 20 that changed over time, and the like, with the image sensor section 34, and outputs the image data including the color measurement adjustment color patch CP and the reference chart KC to the color measurement control unit 106 at the time of color adjustment processing. The color measurement control unit 106 converts the color measurement adjustment color patch CP imaged by the image sensor section 34 at the time of color adjustment processing acquired from the image capturing unit 30 to the initial reference RGB value RdGdBd of the patches Pa to Pe of the reference chart KC simultaneously read and stored when the reference color patch (hereinafter referred to as initial reference color patch) of the reference sheet KS is read with the image capturing unit 30, and then performs color measurement processing of extracting a portion having linearity of the color measurement adjustment color patch CP, performing linear conversion and obtaining the color measurement value on the initial reference RGB value RdGdBd.

In other words, the calculating unit 124 controls the operation of the color measurement control unit 106, the color measurement value calculating portion 126 executes the color measurement processing and outputs the color measurement value, which is the processing result of the color measurement processing, to the CPU 101. The CPU 101 performs color adjustment processing on the image data using the color measurement value and controls the print head 20 based on the color adjustment processed image data to form an image with the color reproducibility enhanced.

The image forming device 1 of the present embodiment is built as the image forming device 1 including the color measuring device for executing the color measuring method for inexpensively and stably achieving color reproducibility, as will be described later, by reading the color measurement program for executing the color measuring method of the present embodiment recorded in a computer readable recording medium such as ROM, EEPROM (Electrically Erasable and Programmable Read Only Memory), EPROM, flash memory, flexible disc, CD-ROM (Compact Disc Read Only Memory), CD-RW (Compact Disc Rewritable), DVD (Digital Versatile Disk), SD (Secure Digital) card, MO (Magneto-Optical Disc) and the like, and introducing the program to the ROM 102 or the non-volatile memory 125. The color measurement program is a computer executable program described with legacy programming language such as assemble, C, C++, C#, Java (registered trademark), and the like, object-oriented programming language and the like, and can be distributed by being stored in the recording medium.

The effects of the present embodiment will be described below. The image forming device 1 of the present embodiment executes the color measuring method for inexpensively and stably achieving color reproducibility.

As illustrated in FIG. 11, the image forming device 1 of the present embodiment stores at least one of the Lab value or the XYZ value, which are the color measurement results of a plurality of reference color patches formed in an array on the reference sheet KS by the spectrometer BS, as a reference color measurement value in correspondence with the patch number in the memory table Tb1 of the non-volatile memory 125.

The image forming device 1 sets the reference sheet KS on the platen 14 of the image forming device 1 in a state the reference color measurement value is stored in the memory table Tb1 of the non-volatile memory 125 and in a state the image forming device 1 is in an initial state by manufacturing, overfall and the like, controls the movement of the carriage 6 to read the reference patch same as that read with the spectrometer BS of the reference sheet KS by the image capturing unit 30. At the same time, the image forming device 1 images each patch (initial reference color patch) of the reference chart KC arranged inside the frame body 32, as illustrated in FIG. 12.

Figures 13A, 13B:
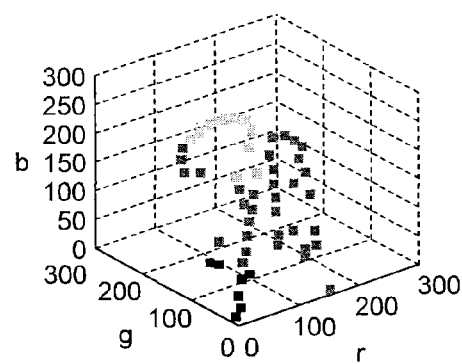
FIGS. 13A and 13B are views illustrating one example of an initial reference RGB value.

After the reference patch of the reference sheet KS and each patch of the reference chart KC are imaged with the image capturing unit 30, the calculating unit 124 stores the imaging reference RGB value, which is the RGB value in which the image data obtained by imaging the reference patch of the reference sheet KS is processed with the image processing unit 110, that is, the device dependent signal dependent on a device in the memory table Tb1 of the non-volatile memory 125 in correspondence with the patch number, that is, in correspondence with the reference color measurement value, as illustrated in FIG. 11. The calculating unit 124 stores the initial reference RGB value RdGdBd, which is the RGB value in which the initial reference color patch of the reference chart KC is read and processed with the image processing unit 110, in the non-volatile memory 125, as illustrated in FIG. 13A.

Figure 12:
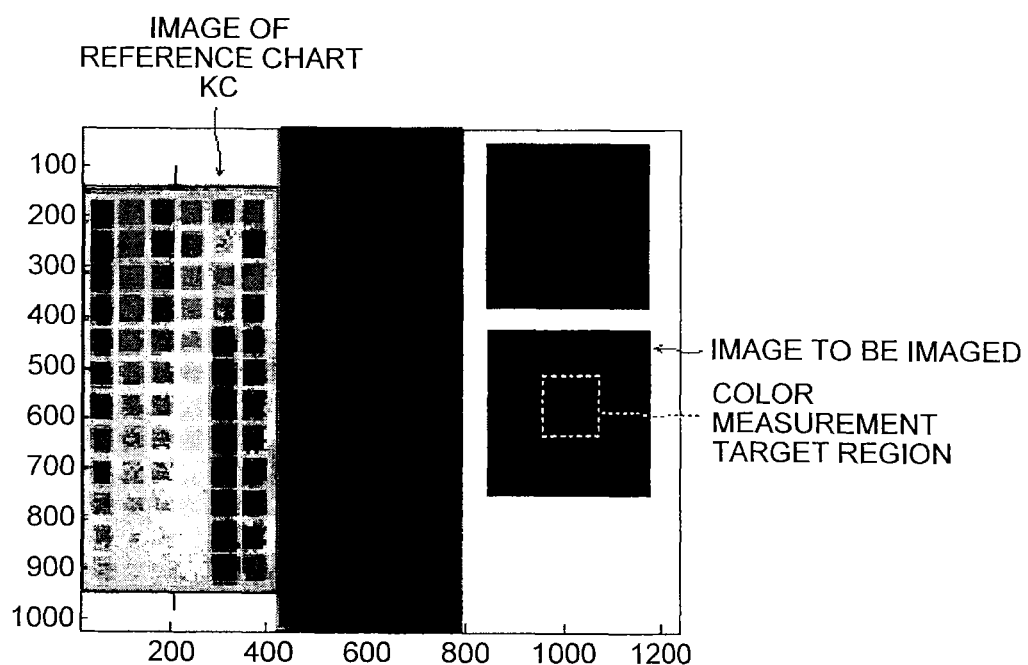
FIG. 12 is a view illustrating one example of image data in which the reference chart and the imaging target are simultaneously imaged.

The calculating unit 124 calculates an average value for every predetermined region, for example, region indicated with a broken line in FIG. 12 (region to be performed with color measurement) among the image data of the initial reference color batch of the reference chart KC read by the image capturing unit 30 to obtain the initial reference RGB value RdGdBd. The influence of noise can be reduced and the bit resolution can be enhanced by averaging a great number of pixels in the region to be performed with color measurement to calculate the initial reference RGB value RdGdBd. FIG. 13B is a scatter diagram in which the initial reference RGB values RdGdBd are plotted, and FIG. 13A illustrates a state in which the reference Lab value Ldadbd, in which the initial reference RGB value RdGdBd is converted to Lab value, and the reference XYZ value xdydzd, in which the initial reference Lab value Ldadbd is converted to XYZ value, are also registered in the non-volatile memory 125.

When the reference color measurement value, the imaging reference RGB value, and the initial reference RGB value RdGdBd are stored in the non-volatile memory 125, the color measurement value calculating portion 126 calculates a reference value linear transformation matrix for mutual conversion on the pair of XYZ value of the reference color measurement value and the imaging reference RGB value stored in the non-volatile memory 125, that is, the pair of XYZ value and the imaging reference RGB value of the same patch number. The color measurement value calculating portion 126 stores the calculated reference value linear transformation matrix in the non-volatile memory 125.

In this state, the CPU 101 performs the main-scanning movement control of the carriage 6, the conveying control of the recording medium P by the paper conveying unit 107, and the drive control of the print head 20 based on the image data, print setting and the like input from outside, and controls the ink discharge from each print head 20y, 20m, 20c, 20k of the print head 20 while intermittently conveying the recording medium P to record and output the image on the recording medium P.

In this case, the discharging amount of ink from the print head 20y, 20m, 20c, 20k sometimes changes due to properties unique to the device, temporal change and the like. The image is formed with a color different from the color of the image intended by the user if the discharging amount of ink is changed, whereby the color reproducibility degrades.

The image forming device 1 thus executes the color adjustment processing for obtaining the color measurement value and performing color adjustment based on the color measurement value at a predetermined color adjustment processing timing.

Figure 14:
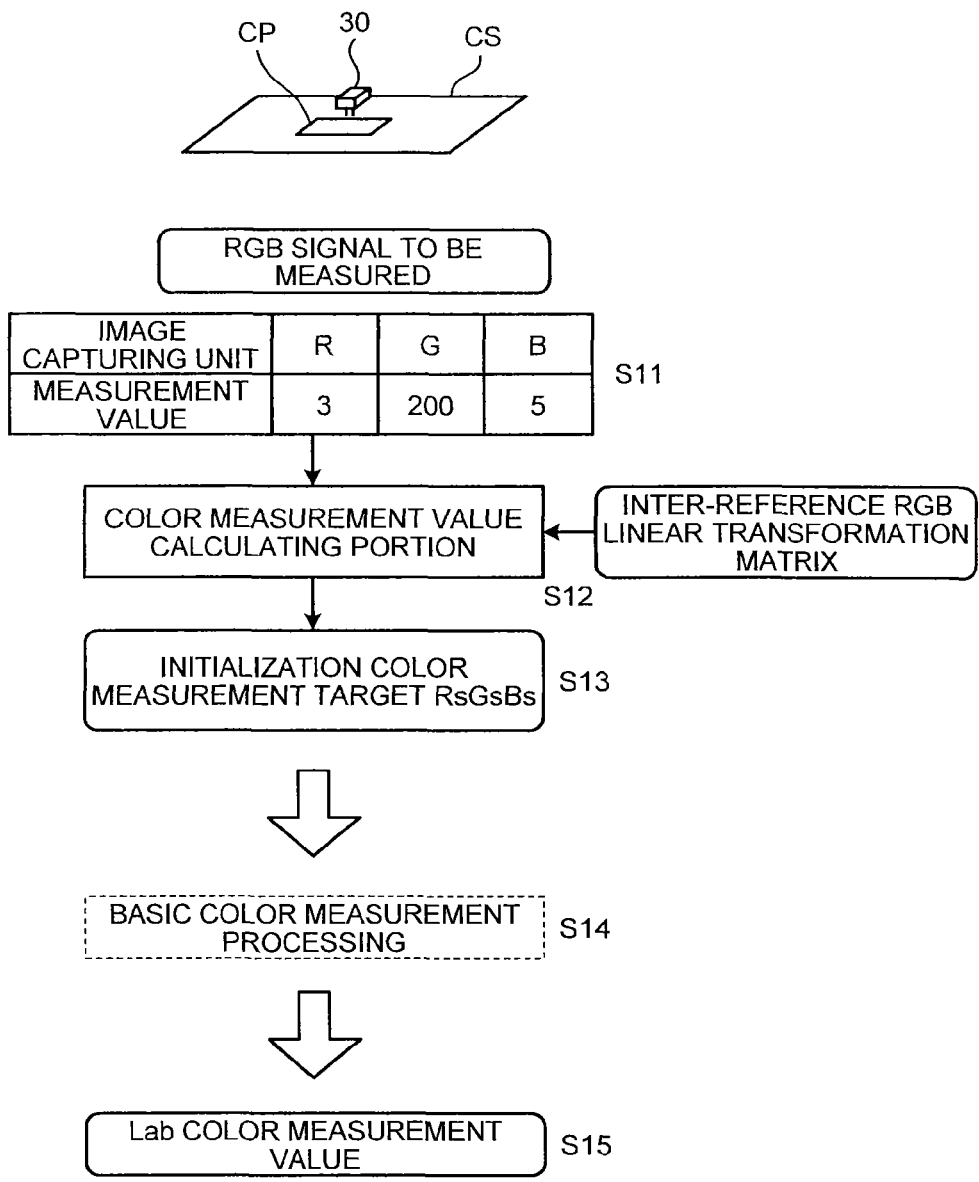
FIG. 14 is an explanatory view of the color measurement processing.

In other words, when the color adjustment processing timing is reached, the image forming device 1 forms a plurality of color patches (color measurement adjustment color patch) CP on the recording medium P with the print head 20 and records and outputs the same as the color measurement adjustment sheet CS, as illustrated in FIG. 14. The color measurement adjustment sheet CS is such that the color measurement adjustment color patch CP, which is a plurality of color patches for color measurement adjustment, is formed and output by the print head 20. The color measurement adjustment sheet CS is formed with the color measurement adjustment color patch CP reflecting the output properties in the color adjustment processing timing of the image forming device 1, in particular, the output properties of the print head 20. The color patch data of the color measurement adjustment color patch CP is stored in advance in the non-volatile memory 125, and the like.

As will be described later, the image forming device 1 converts the color measurement target RGB value to the initial reference RGB value RdGdBd with the RGB value of imaging a plurality of color measurement adjustment color patches CP of the color measurement adjustment sheet CS as the color measurement target RGB value (color measurement RGB value), and selects the reference color measurement value (proximate reference color measurement value) that is close in terms of distance to the color measurement value in which the initial reference RGB value RdGdBd is converted among the reference color measurement values registered in the memory table Tb1 of the non-volatile memory 125. The image forming device 1 obtains the color measurement value for converting the color measurement target RGB value to the selected proximate reference color measurement value, and outputs the image with the print head 20 based on the image of after the color conversion is performed based on the relevant color measurement value. The color reproducibility of the formed image by the image forming device 1 thereby enhances.

As illustrated in FIG. 14, the image forming device 1 controls the movement of the carriage 6, and images a plurality of color measurement adjustment color patches CP of the color measurement adjustment sheet CS on the platen 14 with the image capturing unit 30, and at the same time, images the patch of the reference chart KC with the image capturing unit 30 in a state the color measurement adjustment sheet CS is set on the platen 14 or the color measurement adjustment sheet CS is held on the platen 14 without being discharged at the recorded stage. After simultaneously imaging the color measurement adjustment color patch CP of the color measurement adjustment sheet CS and the patch of the reference chart KC with the image capturing unit 30, the image processing unit 110 performs the necessary image processing on the image data of the color measurement adjustment color patch CP of the color measurement adjustment sheet CS and the image data of the patch of the reference chart KC, and then transmits to the color measurement control unit 106 the image data (RGB value) of the color measurement adjustment color patch CP of the color measurement adjustment sheet CS as the color measurement target RGB value, that is, the device dependent signal that depends on the device, and the image data (RGB value) of the patch Pa of the reference chart KC as the color measurement reference RGB value RdsGdsBds. The color measurement control unit 106 temporarily saves the same in the frame memory 121 (step S11), as illustrated in FIG. 14.

The color measurement control unit 106 causes the color measurement value calculating portion 126 of the calculating unit 124 to transform the color measurement target RGB value saved in the frame memory 121 to an initialization color measurement target RGB value RsGsBs using an inter-reference RGB linear transformation matrix to be described later (steps S12, S13).

The calculating unit 124 of the color measurement control unit 106 executes a basic color measurement processing, to be described later, with the transformed initialization color measurement target RGB value RsGsBs as the color measurement target RGB value (step S14), and acquires a Lab color measurement value (step S15).

Figure 15:
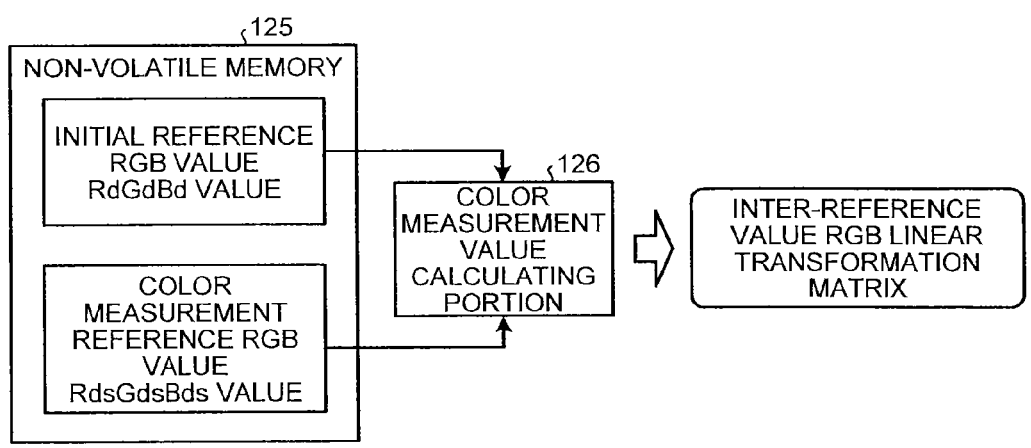
FIG. 15 is an explanatory view of an inter-reference RGB linear transformation matrix generation processing.
Figure 16:
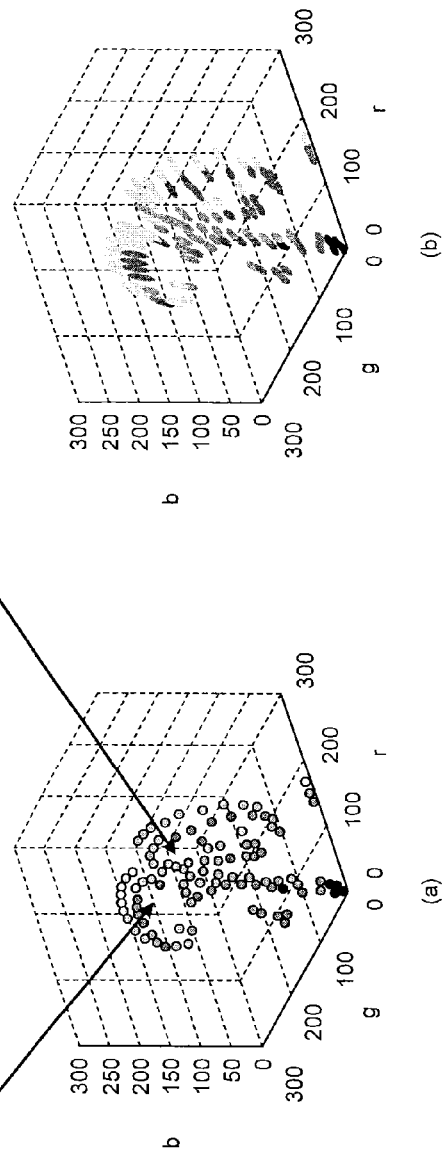
FIG. 16 is a view illustrating a relationship of an initial reference RGB value and a color measurement reference RGB value.

In the image forming device 1 of the present embodiment, the color measurement value calculating portion 126 of the calculating unit 124 obtains the inter-reference RGB linear transformation matrix as illustrated in FIG. 15 and FIG. 16.

In other words, as illustrated in FIG. 15, the color measurement value calculating portion 126 of the calculating unit 124 reads out from the non-volatile memory 125 the initial reference RGB value RdGDBd in which the patch of the reference chart KC is imaged at the same time as when the reference color patch KP of the reference sheet KS is imaged with the image capturing unit 30 at the beginning and stored in the non-volatile memory 125, and the color measurement reference RGB value RdsGdsBds in which the patch of the reference chart KC is imaged at the same time as when the color measurement adjustment color patch CP of the color measurement adjustment sheet CS is imaged with the image capturing unit 30 at the time of color measurement and stored in the non-volatile memory 125. The color measurement value calculating portion 126 obtains the inter-reference RGB linear transformation matrix for transforming the color measurement reference RGB value RdsGdsBds to the initial reference RGB value RdGdBd, and stores the obtained inter-reference RGB linear transformation matrix in the non-volatile memory 125.

In other words, in FIG. 16, the white points illustrated in (a) of FIG. 16 are the points in which the initial reference RGB values RdGdBd are plotted in the rgb space, and the black points are the points in which the color measurement reference RGB values RdsGdsBds are plotted in the rgb space. As apparent from (a) of FIG. 16, the value of the color measurement reference RGB value RdsGdsBds is fluctuated from the value of the initial reference RGB value RdGdBd. The fluctuating direction in the rgb space is substantially the same as illustrated with an arrow in (b) of FIG. 16 but the shifting direction differs by hue. Therefore, the reason the RGB value fluctuates even if the patch of the same reference chart KC is imaged includes temporal change of the illumination light source 37, temporal change of the two-dimensional image sensor 35, and the like.

Therefore, if the color measurement value is obtained using the color measurement target RGB value of when the color measurement adjustment color patch CP of the color measurement adjustment sheet CS is imaged while fluctuating when the patch of the same reference chart KC is imaged, the color measurement value may contain error by the amount of fluctuation.

The image forming device 1 of the present embodiment thus uses a method of least squares between the initial reference RGB value RdGdBD and the color measurement reference RGB value RdsGdsBds to obtain the inter-reference RGB linear transformation matrix for transforming the color measurement reference RGB value RdsGdsBds to the initial reference RGB value RdGdBd. The image forming device 1 uses the relevant inter-reference RGB linear transformation matrix to transform the color measurement target RGB value obtained by imaging the color measurement adjustment color patch CP of the color measurement adjustment sheet CS with the image capturing unit 30 and storing in the non-volatile memory 125 to the initialization color measurement target RGB value RsGsBs. The image forming device 1 then executes the basic color measurement processing, to be described later, with the transformed initialization color measurement target RGB value RsGsBs as the color measurement target RGB value to acquire the Lab color measurement value.

The inter-reference RGB linear transformation matrix is not limited to be one-order and may be a nonlinear matrix of higher order. The high-order matrix is adopted when the non-linearity is high between the rgb space and the XYZ space to enhance the transformation accuracy.

When imaging the reference color patch KP of the reference sheet KS and the color measurement adjustment color patch CP of the color measurement sheet CS serving as the subject through the opening 33c formed in the bottom surface portion 32a, the image capturing unit 30 simultaneously images the patch Pa of the reference sheet KS arranged in the recess 32d of the bottom surface portion 32a of the frame body 32. The reference color patch KP of the reference sheet KS and the color measurement adjustment color patch CP of the color measurement adjustment sheet CS having the patch of the reference sheet KS as the subject can be imaged always at the same position relationship, whereby imaging can be carried out in a stable state.

Furthermore, the reference color patch KP of the reference sheet KS, the color measurement adjustment color patch CP of the color measurement adjustment sheet CS, and the reference chart KC serving as the subject through the opening 32c are arranged in a state deviated from the mirror reflection region SA of the illumination light source 37, as illustrated in FIG. 6 and FIG. 7. The incident light from the reference color patch KP, the color measurement adjustment color patch CP, and the reference chart KC to the two-dimensional image sensor 35 does not include mirror reflection light. FIG. 6 illustrates a state in which the mirror reflection region SA exists only in the bottom surface portion 32aa between the opening 32b where the reference chart KC is arranged and the opening 32c for imaging the color measurement adjustment color patch CP, and the like. FIG. 7 illustrates a state in which the mirror reflection occurred in the bottom surface portion 32aa.

Therefore, the images of the reference color patch KP, the color measurement adjustment color patch CP, and the reference chart KC imaged by the image sensor section 34 can be prevented from containing defect images caused by the mirror reflection light of the illumination light source 37, and color measurement can be performed at high accuracy.

The image capturing unit 30 can simultaneously image both the reference chart KC and the imaging surface of the recording medium P under the same illumination condition, where the illumination light that irradiates the imaging surface of the recording medium P through the opening 32c and the illumination light that irradiates the reference chart KC are illumination light from the same illumination light source 37. The illumination light source 37 is arranged on the center line Lo, which is substantially an intermediate position of the reference chart KC and the recording medium P, and two of which are arranged on the center line Lo with respect to the lens 36. The reference chart KC and the image capturing region of the recording medium P thus can be evenly illuminated with substantially the same condition.

The image capturing unit 30 has the arrangement condition of the opening 32c and the reference chart KC of the image capturing region arranged substantially symmetric to the center line Lo connecting the center of the lens 36 and the illumination light source 57. The imaging condition of the two-dimensional image sensor 35 thus may be line symmetric and may be the same, whereby the accuracy in the color adjustment processing and the color measurement processing of the two-dimensional image sensor 35 using the reference chart KC can be enhanced.

Figure 17:
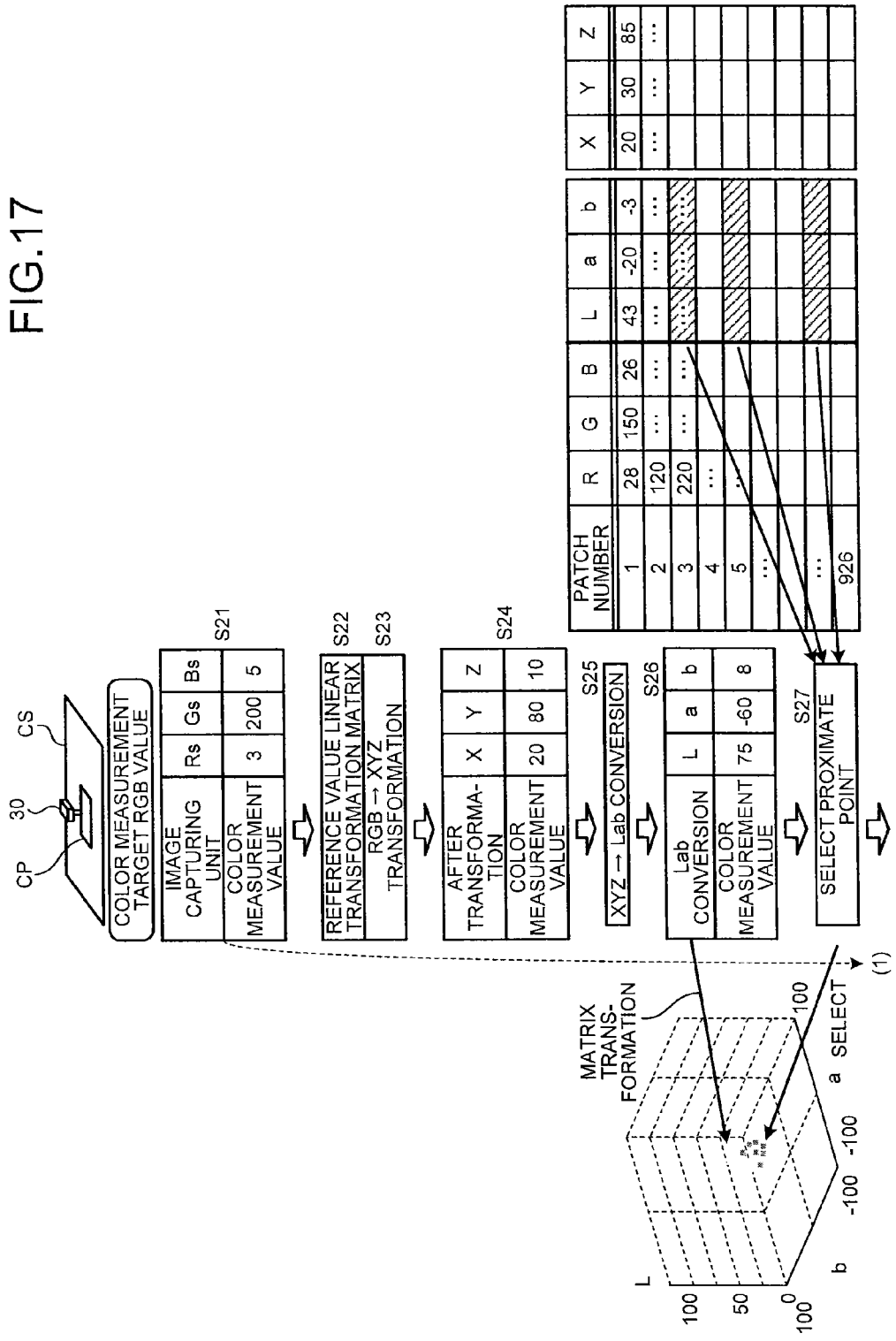
FIG. 17 is an explanatory view of a basic color measurement processing.
Figure 18:
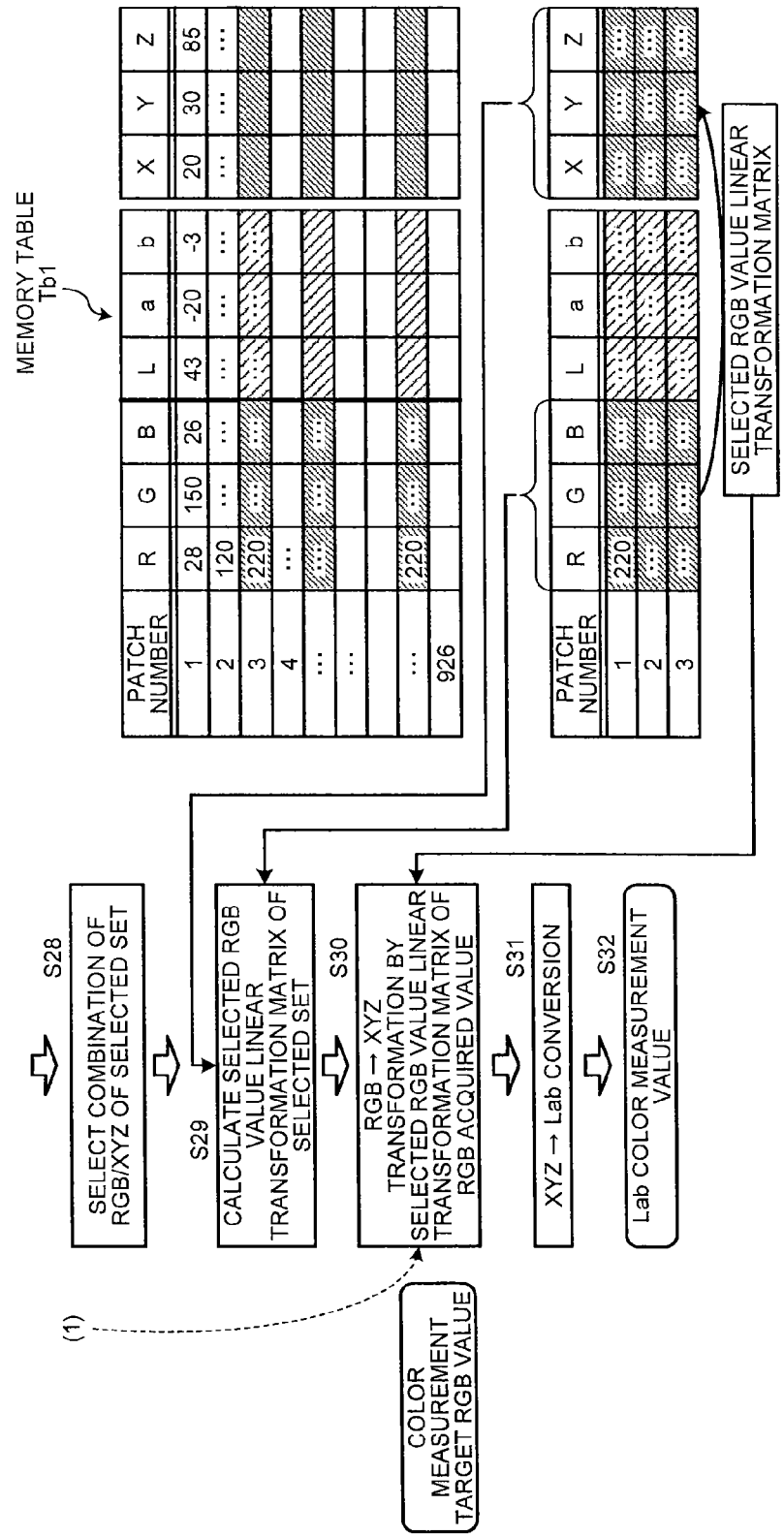
FIG. 18 is a view illustrating the basic color measurement processing following FIG. 17.

The image forming device 1 obtains the initial color measurement target RGB value RsGsBs in the above manner, and selects the proximate reference color measurement value (proximate reference color measurement value) close in terms of distance to the color measurement value transformed to the color measurement target RGB value among the reference color measurement values registered in the memory table Tb1 of the non-volatile memory 125, as illustrated in FIG. 17 and FIG. 18. The image forming device 1 executes the basic color measurement processing of obtaining the color measurement value for converting the color measurement target RGB value to the selected proximate reference color measurement value, and outputs the image by the print head 20 based on the image data of after the color conversion is performed based on the color measurement value. The color reproducibility of the formed image by the image forming device 1 thus enhances.

In other words, as illustrated in FIG. 17, the image forming device 1 images the color measurement adjustment color patch CP of the color measurement adjustment sheet CS to obtain the initial color measurement target RGB value RsGsBs as described above, stores the same in the non-volatile memory 125 as the color measurement target RGB value (step S21), uses the reference value linear transformation matrix (step S22) to transform to the first XYZ value (step S23) and stores the same in the non-volatile memory 125 (step S24). For example, in FIG. 17, the color measurement value calculating portion 126 converts the color measurement target RGB value (3, 200, 5) of the image capturing unit 30 to the first XYZ value (first color measurement value) of (20, 80, 10), and stores the same in the non-volatile memory 125.

The color measurement value calculating portion 126 references the memory table Tb1 of the non-volatile memory 125 or uses a known conversion equation to convert the first XYZ value to the first Lab value (first color measurement value) (step S25), and stores the same in the non-volatile memory 125 (step S26). For example, in FIG. 17, the color measurement value calculating portion 126 converts the first XYZ value (20, 80, 10) to the first Lab value (75, −60, 8), which is the imaging color measurement value.

The color measurement value calculating portion 126 then searches for the reference color measurement value (Lab value) of the color patch of a plurality of colors in the memory table Tb1 stored in the non-volatile memory 125 and selects a set of color patches (proximate color patches) close in distance to the first Lab value on the Lab space (step S27), as illustrated in the Lab space of FIG. 17. For example, in the diagram of the Lab space of FIG. 17, a diagram in which 60 color patches are selected and plotted on the Lab space is illustrated. A method that can be applied includes a method of selecting the patches close in distance includes calculating the distance between the first Lab value and all points in the reference color measurement value (Lab value) of the plurality of color patches, and selecting the reference Lab value (hatched reference Lab value in FIG. 17) of the color patches close in distance to the first Lab value, which is the first color measurement value, for example.

As illustrated in FIG. 17, the color measurement value calculating portion 126 references the memory table Tb1 to select the combination of the imaging reference RGB value in pair with the first Lab value of the selected set, that is, the imaging reference RGB value (selected RGB value) of the same patch number as the first Lab of the selected set and the reference XYZ value (step S28). The color measurement value calculating portion 126 obtains using the method of least squares a selected RGB value linear transformation matrix for transforming between the sets of the imaging reference RGB value of the selected combination (selected set) and the reference XYZ value, and stores the obtained selected RGB value linear transformation matrix in the non-volatile memory 125 (step S29).

The color measurement value calculating portion 126 obtains the second XYZ value, which is the second color measurement value, by converting the color measurement target RGB value in which each color measurement adjustment color patch CP of the color measurement adjustment sheet to be performed with color measurement is imaged with the image capturing unit 30 using the selected RGB value linear transformation matrix (step S30). The color measurement value calculating portion 126 converts the second XYZ value to the second Lab value using the known conversion equation (step S31), and acquires the final color measurement value (step S32).

The color measurement value calculating portion 126 performs image adjustment based on the image data on which color conversion is performed using the obtained color measurement value, and drives the print head 20 based on the image adjusted image data to form the image.

In other words, the image forming device 1 of the present embodiment obtains the color measurement target RGB value acquired when a plurality of color measurement adjustment color patches CP of the color measurement adjustment sheet CS reflecting the output properties of the print head 20 at the color adjustment processing timing is imaged and the first Lab value acquired when the reference sheet KS is imaged in an initial state using the reference value linear transformation matrix. The image forming device 1 selects a set of patches with the reference Lab value close in distance to the first Lab value in the Lab space among the reference Lab values of the patches of a plurality of colors registered in the memory table Tb1, and converts the color measurement target RGB value corresponding to the selected reference Lab value to the Lab value using the selected RGB value linear transformation matrix to obtain the Lab color measurement value. The color measurement value calculating portion 126 performs image adjustment based on the image data on which color conversion is performed using the obtained color measurement value, and drives the print head 20 based on the image adjusted image data to form the image.

Therefore, in the image forming device 1 of the present embodiment, the image capturing unit 30 includes the frame body 32 of a predetermined box shape in which the opening 32c for imaging the subject and the reference chart KC imaged simultaneously with the subject imaged through the opening 32c to provide a predetermined color reference are arranged on an opposing surface facing the subject side by side in a predetermined direction; the image sensor section (sensor section) 34 for receiving the reflected light from the subject facing the opening 32c and the reflected light from the reference chart KC to simultaneously image the subject and the reference chart KC; and the illumination light source 37 arranged at a position where the reflected light entering to the image sensor section 34 of the reflected light of the illumination light to the subject and the reference chart KC is outside the mirror reflection region.

Therefore, the mirror reflection light from the illumination light source 37 attached inside the frame body 32 can be prevented from overlapping the images of the subject outside the frame body 32 and the reference chart KC inside the frame body 32 and being entered to the image sensor section 34, whereby the subject and the reference chart KC can always be imaged in a stable position relationship.

The image capturing unit 30 has the illumination light source 37 arranged at a position where the mirror reflection region overlaps the bottom surface portion 32aa, which is the intermediate region of the image capturing region of the subject and the image capturing region of the reference chart KC through the opening 32c.

Therefore, the mirror reflection light from the illumination light source 37 can be prevented from overlapping the images of the subject outside the frame body 32 and the reference chart KC inside the frame body 32 and being entered to the image sensor section 34, with a simple and inexpensive configuration, whereby the subject and the reference chart KC can always be imaged in a stable position relationship.

Furthermore, the image capturing unit 30 has the illumination light source 37 arranged in a pair at positions symmetric in the length direction with respect to the center of the length direction of the bottom surface portion 32aa, which is the intermediate region having a predetermined length.

Therefore, the mirror reflection light from the illumination light source 37 can be prevented from overlapping the images of the subject outside the frame body 32 and the reference chart KC inside the frame body 32 and being entered to the image sensor section 34. Furthermore, the subject and the reference chart KC can be irradiated evenly with the illumination light, whereby the subject and the reference chart KC can always be imaged at high accuracy and in a stable position relationship.

Figure 19:
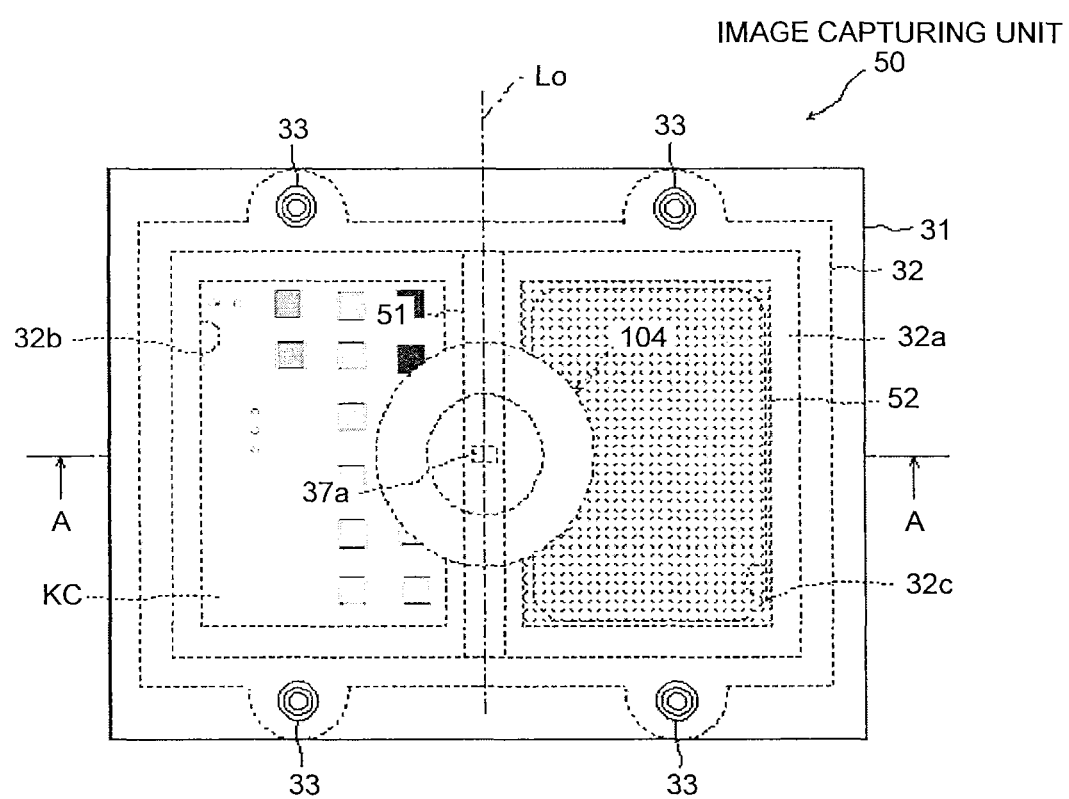
FIG. 19 is a plan view of an image capturing unit including a light shielding member.
Figure 20:
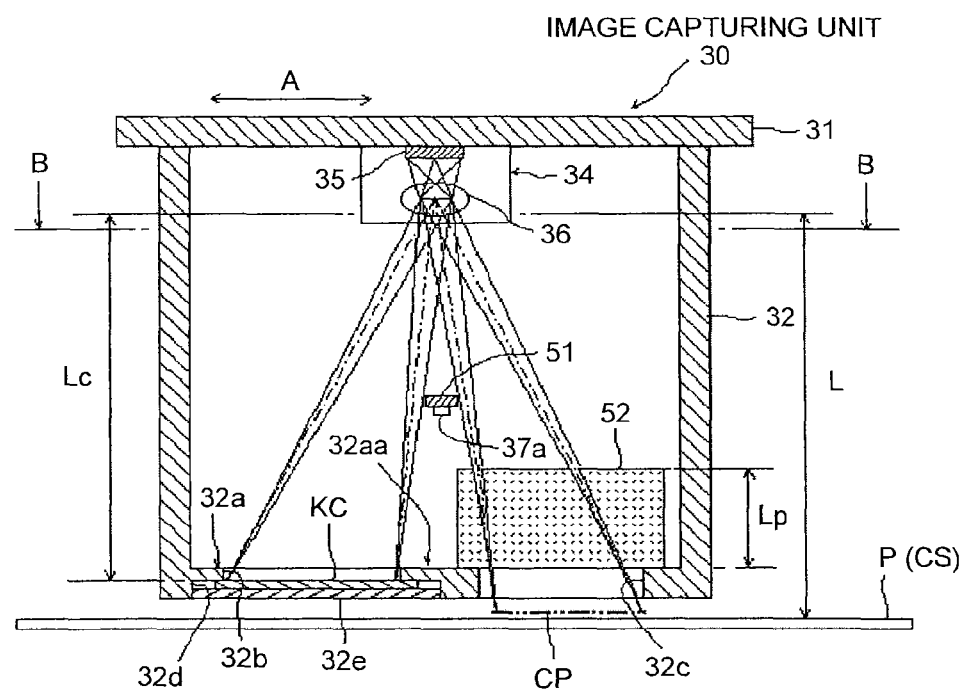
FIG. 20 is a cross-sectional view taken in the direction of arrow A-A of the image capturing unit of FIG. 19.
Figure 21:
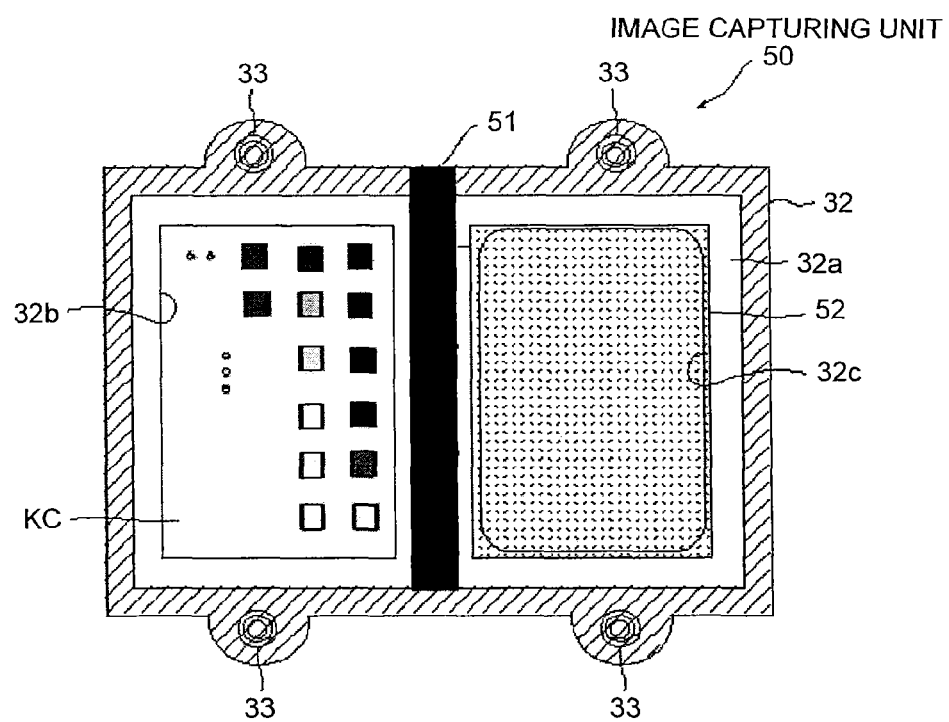
FIG. 21 is a cross-sectional view taken in the direction of arrow B-B of the image capturing unit of FIG. 20.
Figure 22:
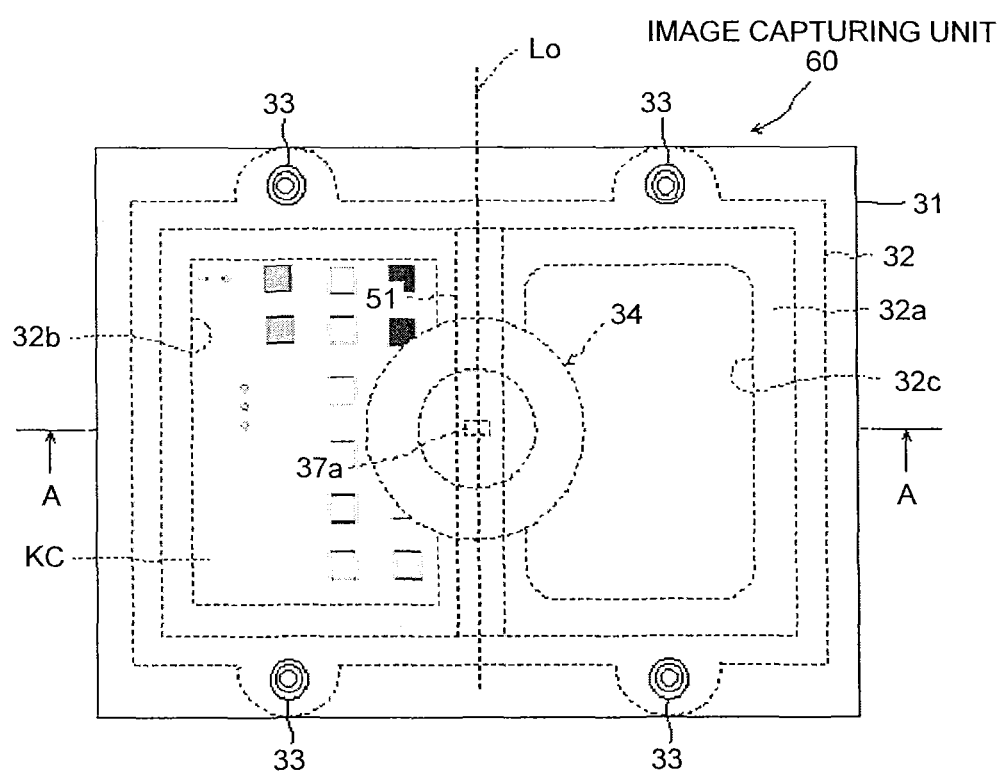
FIG. 22 is a plan view of another image capturing unit including a light shielding member.
Figure 23:
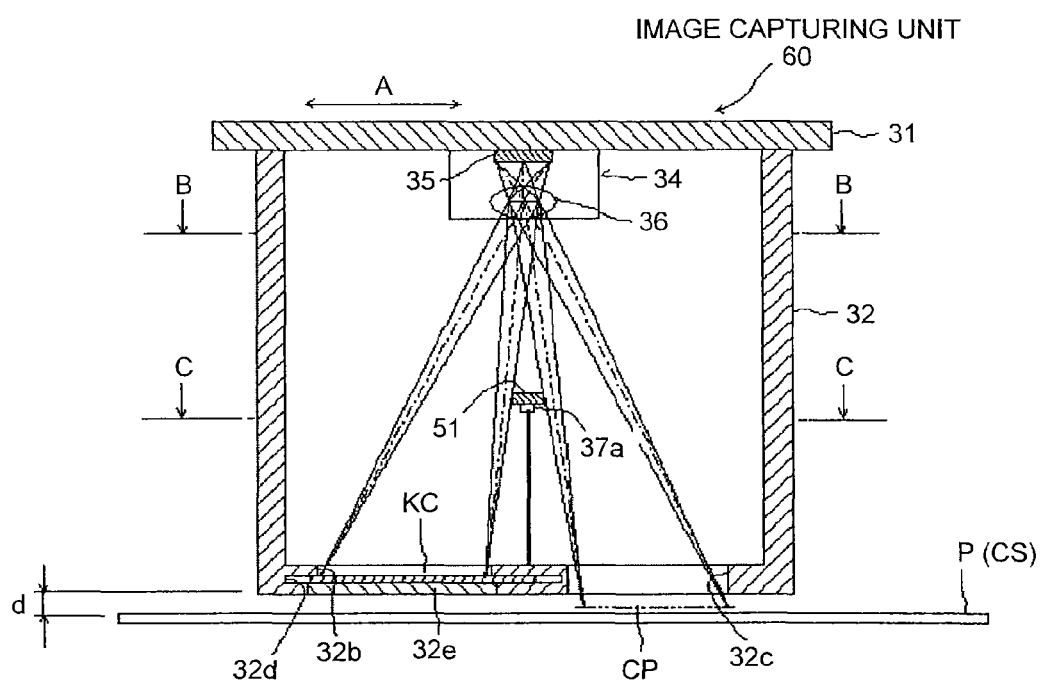
FIG. 23 is a cross-sectional view taken in the direction of arrow A-A of the image capturing unit of FIG. 22 illustrating a mirror reflection light.
Figure 24:
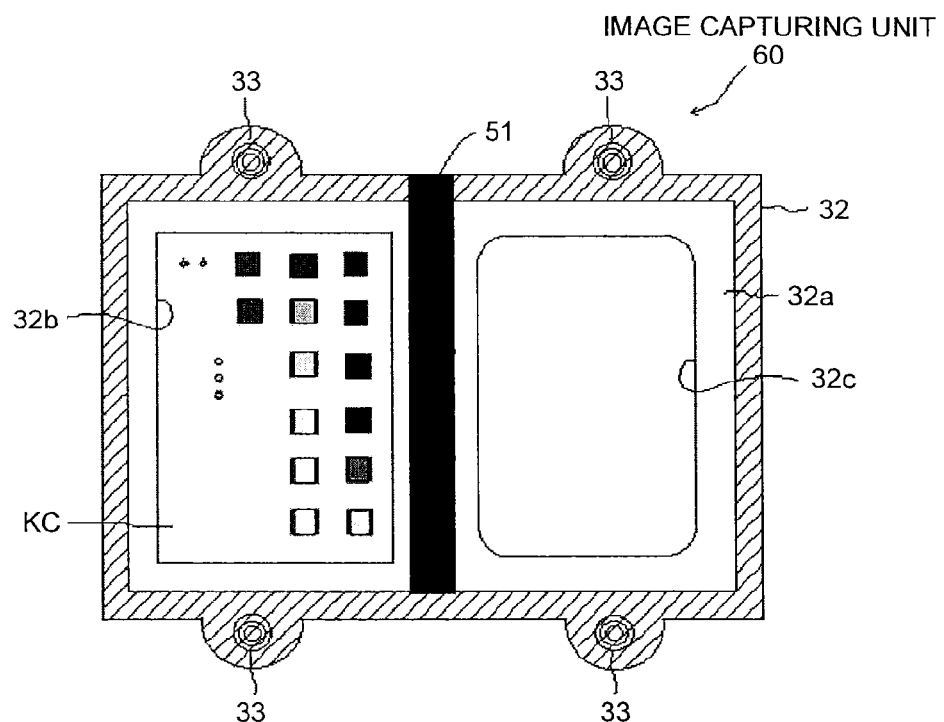
FIG. 24 is a cross-sectional view taken in the direction of arrow B-B of the image capturing unit of FIG. 23.
Figure 25:
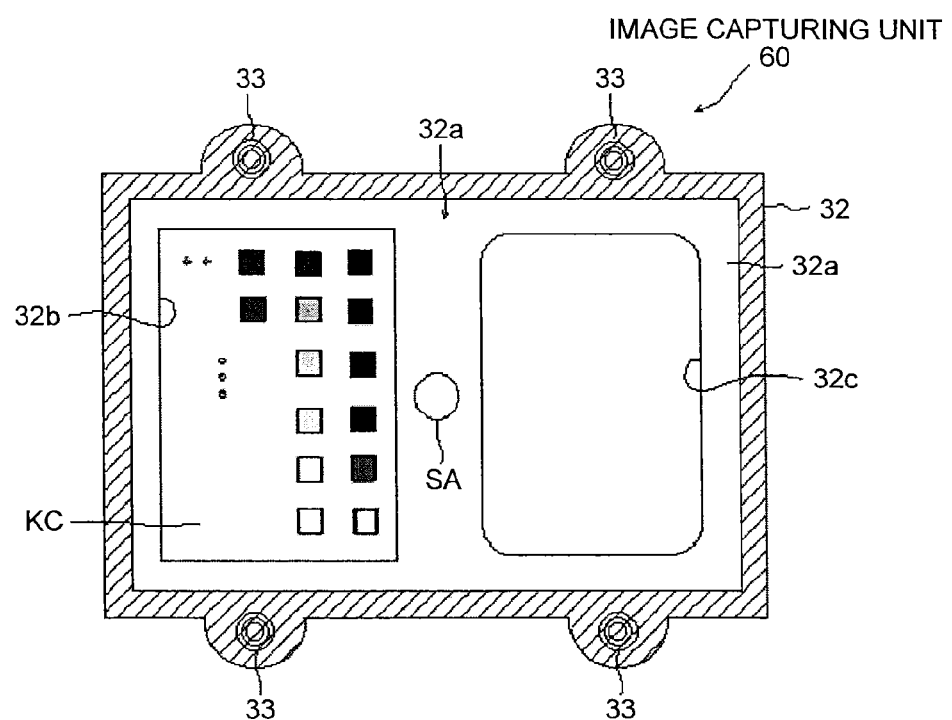
FIG. 25 is a cross-sectional view taken in the direction of arrow C-C of the image capturing unit of FIG. 23.

In the description made above, the image capturing unit 30 has the pair of illumination light sources 37 arranged in a state the reference color patch KP of the reference sheet KS, the color measurement adjustment color patch CP of the color measurement adjustment sheet CS, and the reference chart KC serving as the subject through the opening 32c are outside the mirror reflection region SA of the illumination light source 37, thus preventing the influence of mirror reflection of the illumination light source 37 on the image imaged by the image sensor section 34. The configuration for preventing the influence of mirror reflection of the illumination light source 37 is not limited to the configuration described above. For example, a light shielding member 51 for shielding the mirror reflection may be arranged as in an image capturing unit 50 illustrated in FIG. 19 to FIG. 21. FIG. 19 is a plan view of the image capturing unit 50, FIG. 20 is a cross-sectional view taken in the direction of arrow A-A of the image capturing unit 50 of FIG. 19, and FIG. 21 is a cross-sectional view taken in the direction of arrow B-B of the image capturing unit 50 of FIG. 20. In FIG. 19 to FIG. 21, the same reference numerals are denoted on the configuring portions similar to the image capturing unit 30 of FIG. 4 to FIG. 7, and the detailed description thereof will be omitted.

In other words, the light shielding member 51 is arranged over a side surface facing in the sub-scanning direction of the frame body 32 while extending in the center line Lo in the sub-scanning direction passing through the center of the image sensor section 34 at a substantially intermediate position of the image sensor section 34 and the bottom surface portion 32a at immediately below the image sensor section 34. The light shielding member 51 is attached with the illumination light source 37a on the surface on the bottom surface portion 32a side of the center position in the sub-scanning direction, that is, at the position immediately below the center of the image sensor section 34, thus holding the illumination light source 37a.

As illustrated in FIG. 21, the light shielding member 51 is necessary for shielding the incidence of the mirror reflection light exit from the illumination light source 37a toward the bottom surface portion 32a and reflected by the bottom surface portion 32a from entering the image sensor section 34, and has a width that does not inhibit the reflected light from the reference chart KC and the reflected light from the subject through the opening 32c from entering the image sensor section 34.

The image capturing unit 50 includes an optical path length changing member 52 arranged on the optical path of the recording medium P and the two-dimensional image sensor 35 through the opening 32c with the opening 32c closed. The optical path length changing member 58 is a transmissive member having an index of refraction n (n is an arbitrary value). As illustrated in FIG. 20, the optical path length changing member 52 has an outer shape greater than the opening 32c and is arranged in the frame body 32. The fixed position of the optical path length changing member 52 is not limited to the position on the opening 32c at inside the frame body 32. The fixed position may be a position on the imaging surface side of the frame body 32, a position on the inner side of the frame body 32 and distant from the opening 32c, and the like, for example, as long as it is on the optical path of the opening 32c and the two-dimensional image sensor 35. When light transmits through the optical path length changing member 52 having an index of refraction n, such light enters the two-dimensional image sensor 35 with the optical path length extended according to the index of refraction n of the optical path length changing member 52 and the image bulged out, where the amount of bulging C of the image can be obtained with the following equation (1) assuming the length of the optical path length changing member 52 is Lp.

$$C = Lp(1 - 1/n) \quad (1)$$

The focal length L of the focus surface of the image capturing unit 50 other than the reference sheet KC, that is, the focal length to the surface of the recording medium P imaged through the optical path length changing member 52 and the opening 32c can be obtained with the following equation (2).

$$L = Lc + Lp(1 - 1/n) \quad (2)$$

Lc is a distance between a vertex portion on the imaging target side of the lens 36 and the reference chart KC and n is the index of refraction of the optical path length changing member 52.

Therefore, for example, if the index of refraction n of the optical path length changing member 52 is 1.5, $L = Lc + Lp(1 - 1/1.5) = Lc + Lp(1/3)$ is obtained, whereby the optical path length can be extended by about $1/3$ of the length Lp of the optical path length changing member 52. If Lp=9 [mm] and L=Lc+3 [mm], the imaging position of the reference chart KC and the focus position of the imaging surface of the recording medium P can be coincided, and the reference chart KC and the imaging surface of the recording medium P can be set to a conjugate relationship.

The illumination light that irradiates the reference chart KC and the illumination light that irradiates the imaging surface of the recording medium P through the optical path length changing member 52 and the opening 32c are illumination lights from the same illumination light source 37a. Thus, the image capturing unit 50 can simultaneously image the reference chart KC and the imaging surface of the recording medium P under the same illumination condition, similar to the case of the image capturing unit 30. The illumination light source 37a is arranged on the center line Lo, which is substantially an intermediate position of the reference chart KC and the recording medium P, and has the light shielding member 51 attached at a position immediately below the lens 36. Thus, the image capturing region of the reference chart KC and the recoding medium P can be illuminated evenly under substantially the same condition.

The image capturing unit 50 has the arrangement condition of the opening 32c and the reference chart KC of the image capturing region arranged substantially symmetric to the center line Lo connecting the center of the lens 36 and the illumination light source 37a. The imaging condition of the two-dimensional image sensor 35 thus may be line symmetric and may be the same, whereby the accuracy in the color adjustment processing and the color measurement processing of the two-dimensional image sensor 35 using the reference chart KC can be enhanced.

Therefore, the image capturing unit 50 has the illumination light source 37a arranged at a position spaced apart by a predetermined distance in a perpendicular direction toward the bottom surface portion 32a side, which is the opposing surface, from the image sensor section 34, in a state of emitting the irradiation light in the direction of the bottom surface portion 32a, and includes the light shielding member 51 for shielding the entering of the mirror reflection light of the illumination light emitted from the illumination light source 37a to the image sensor section 34.

Therefore, the mirror reflection light of the illumination light source 37a can be reliably prevented from entering the image sensor section 34, and the subject and the reference chart KC can always be imaged at high accuracy in a stable position relationship.

Furthermore, the image capturing unit 50 has the illumination light source 37a attached to the surface on the bottom surface portion 32a side of the light shielding member 51.

Therefore, the mirror reflection light of the illumination light source 37a can be reliably prevented from entering the image sensor section 34 with a simple configuration, and the subject and the reference chart KC can always be imaged at high accuracy inexpensively and in a stable position relationship.

Figure 26:
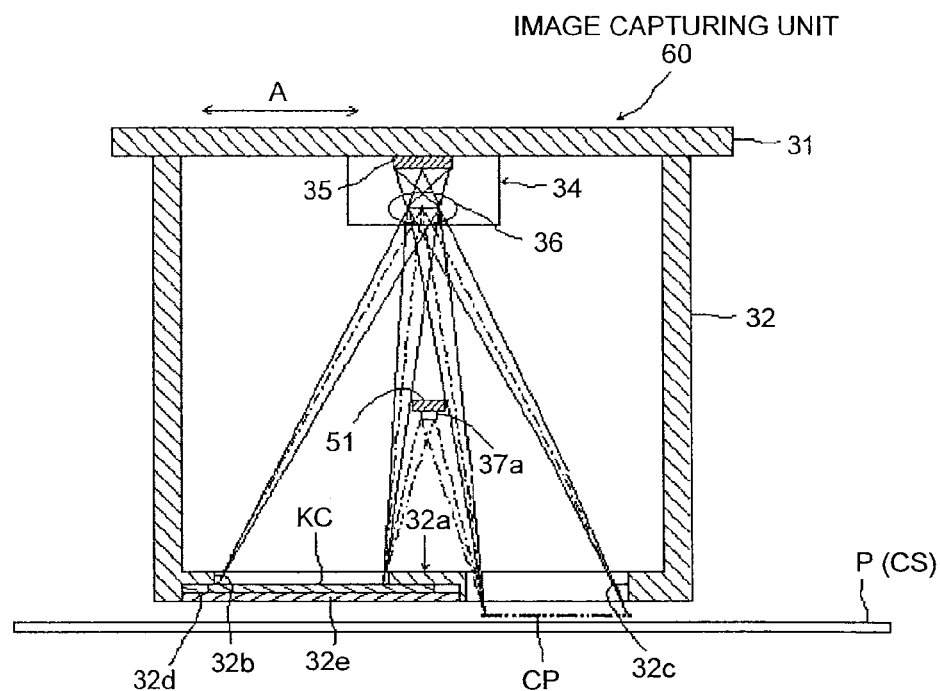
FIG. 26 is a cross-sectional view taken in the direction of arrow A-A of the image capturing unit of FIG. 23 illustrating a light irradiation state that does not include the mirror reflection light to the opening.

In this case, the image capturing unit 50 may not always include the optical path length changing member 52, as illustrated in FIG. 22 to FIG. 27 if the focal length to the image sensor section 34 of the subject such as the reference chart KC, the recording medium P, and the like can be ignored in terms of precision. In this case as well, as illustrated in FIG. 26, the light shielding member 51, to which the illumination light source 37a is attached, has a width necessary and sufficient for the reflected light (mirror reflection light) of the mirror reflection region SA of the light irradiated from the illumination light source 37a to the bottom surface portion 32a to enter the image sensor section 34.

Accordingly, the influence on the imaged image of the mirror reflection light can be more inexpensively and reliably prevented.

Figure 27:
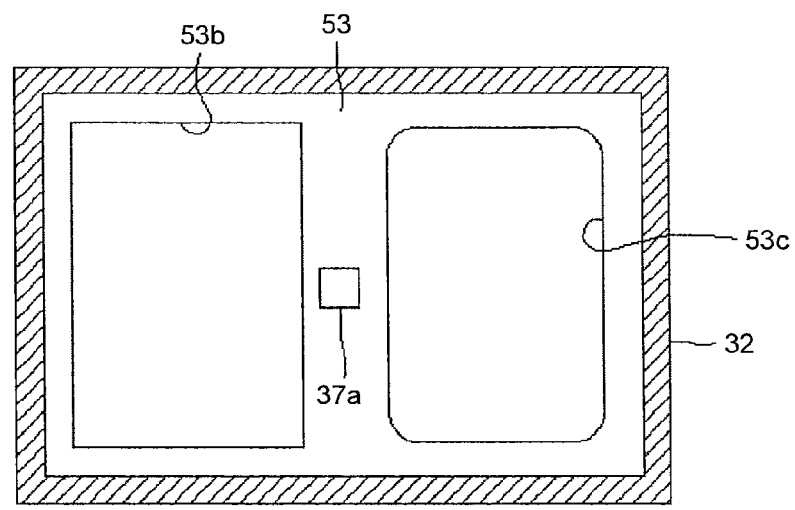
FIG. 27 is a back view of another light shielding member.

As described above, the light shielding member 51 is not limited to a plate shape having a predetermined width that is bridged between the inner side surfaces of the frame body 32 in the sub-scanning direction. For example, as illustrated in FIG. 27, a light shielding member 53 is formed to a flat plate shape that closes the entire interior of the frame body 32 in parallel with the substrate 31 at a substantially intermediate position of arranging the illumination light source 37a of the image sensor section 34 and the bottom surface portion 32a of the frame body 32, and is formed with an opening 53b necessary and sufficient for entering the reflected light from the reference chart KC to the image sensor section 34, and an opening 53c necessary and sufficient for entering the reflected light from the subject through the opening 32c to the image sensor section 34. The light shielding member 53 is a light shielding member portion positioned between the opening 53b and the opening 53c and is attached with the illumination light source 37a at a position immediately below the image sensor section 34.

The light shielding member 53 may be formed integrally with the frame body 32, or may be attached to the frame body 32 through methods such as adhesion, fixation, and the like.

Figure 28:
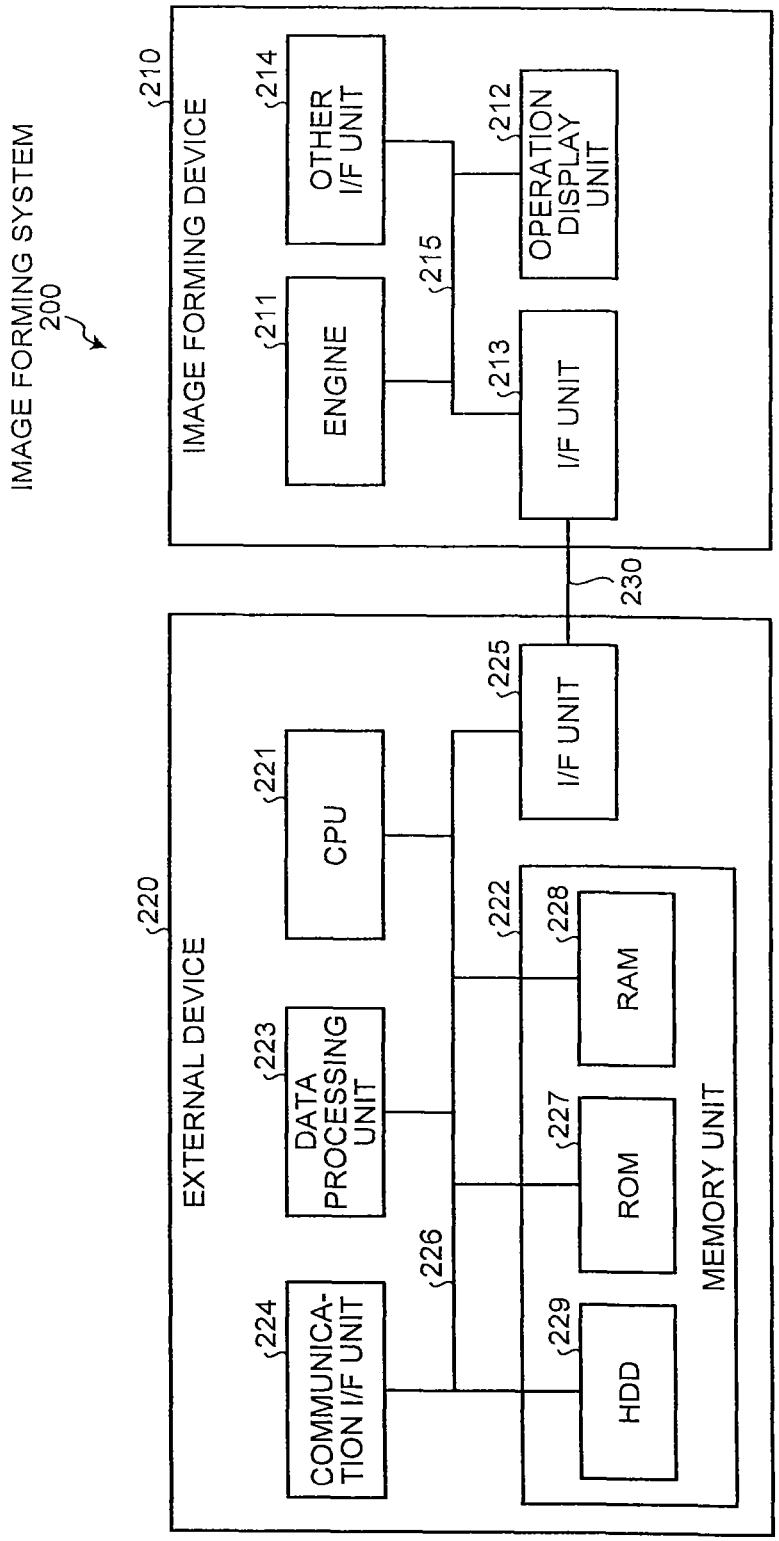
FIG. 28 is a system configuration diagram of an image forming system.

In the description made above, the color measurement processing is carried out by the color measurement control unit 106 of the image forming device 1, but the color measurement processing does not need to be executed in the image forming device 1. For example, as illustrated in FIG. 28, in an image forming system (color measuring system) 200, an image forming device 210 is connected to an external device 220 so that the image data imaged with the image forming device 210 is output to the external device 220 and performed with color adjustment processing involving the color measurement processing by the external device 220, and the image data performed with the color adjustment processing is output to the image forming device 210 so that the image forming device 210 forms the image based on the image data from the external device 220.

In other words, the image forming device 210 includes an engine 211, an operation display unit 212, an I/F unit 213, and other I/F unit 214, and the like, which are connected by a bus 215. The external device 220, for example, can use a normal computer of hardware configuration and software configuration, and executes the color adjustment processing involving the color measurement processing by introducing a color adjustment program including a color measurement program for executing the color adjustment processing involving the color measurement processing of the present invention as software. The external device 220 includes a CPU 221, a memory unit 222, an image processing unit 223, a communication I/F unit 224, an I/F unit 225, and the like, which are connected by a bus 226. The memory unit 222 includes a ROM 227, a RAM 228, a hard disc (HDD), 229, and the like.

The image forming device 210 is connected to the external device 220 by a line 230 with the I/F unit 213, which line 230 is a dedicated line, network such as LAN (Local Area Network), the Internet, and the like, and may be wired or wireless.

The image forming device 210 forms and outputs the image on the recording medium with the engine 211 based on the image data transmitted from the external device 220 under the control of the external device 220. The engine 211 forms the image on the recording medium through ink injection method and the like, the operation display unit 212 includes various operation keys and a display such as LCD (Liquid Crystal Display), so that various information necessary for the operation of the image forming device 210 are performed by the operation key. The operation display unit 212 displays and outputs on the display various information notified from the image forming device 210 to the user. The other I/F unit 214 is used for connection of an extended unit, and the like.

The engine 211 includes a carriage that moves in the main-scanning direction, similar to the description made in the above embodiment. The image capturing unit 30 is attached to the carriage. The image forming device 210 forms the color measurement adjustment color patch CP and generates the color measurement adjustment sheet CS on the recording medium based on the color patch data of the color measurement adjustment color patch CP transmitted from the external device 220 under the control of the CPU 221 of the external device 220. The image forming device 210 reads the color measurement adjustment color patch CP of the generated color measurement adjustment sheet CS with the image capturing unit and transmits the same to the external device 220 through the I/F unit 213.

The external device 220 stores the image forming control program for performing the operation control of the image forming device 210, the color adjustment program for performing the color adjustment processing involving the color measurement processing of the present invention, and the necessary data in the hard disc 229 or the ROM 227. The CPU 221 controls the image forming device 210 based on the program in the ROM 227 or the hard disc 229 to execute the basic processing of the image forming device 210 and execute the color adjustment processing involving the color measurement processing of the present invention.

The hard disc 229 stores the program, and also stores various data necessary for executing the color adjustment processing, in particular, at least one of the Lab value or the XYZ value of the measurement result of a plurality of reference color patches KP formed in an array on the reference sheet KS described in the above embodiment, the imaging reference RGB value of when the reference color patch KP of the reference sheet KS is read with the image capturing unit of the image forming device 210, the reference value linear transformation matrix, the table of proximate points and the selected RGB value linear transformation matrix, the initial reference RGB value RdGdBd of each color patch of the reference chart KCs read at the same time as the reference sheet KS, the color measurement reference RGB value RdsGdsBds of the reference patch of the reference chart KC read at the same time as when the color measurement adjustment color patch CP of the color measurement adjustment sheet CS is read, and the inter-reference RGB linear transformation matrix for converting the color measurement reference RGB value RdsGdsBds to the initial reference RGB value RdGdBd.

The communication I/F unit 224 is connected to the image processing apparatus such as a scanner device, a multifunction peripheral, and other external devices through a line such as network, and receives the image data to image output to the image forming device 210.

The image processing unit 223 performs various image processing necessary for forming and outputting with the engine 211 of the image forming device 210 on the image data.

As described above, the CPU 221 controls the operation of the image forming device 210, and executes the color measurement processing executed by the calculating unit 124 of the color measurement control unit 106, in particular, the color measurement value calculating portion 126 to obtain the color measurement value, performs color adjustment on the image data based on the relevant color measurement value, and outputs to the image forming device 210.

In the image forming system 200 of FIG. 28, the operation of the image forming device 210 is controlled by the external device 220, but the image forming device 210 itself may include a controller such as a CPU so that the relevant controller performs the control for the image forming operation itself, and the external device 220 executes only the color measurement processing for obtaining the color measurement value or only the color adjustment processing including the color measurement processing.

Thus, when at least the color measurement processing or the color adjustment processing including the color measurement processing is executed with the external device of the image forming device 210, the color reproducibility can be enhanced inexpensively and appropriately even in a less expensive image forming device 210.

[Second Embodiment]

Figure 29:
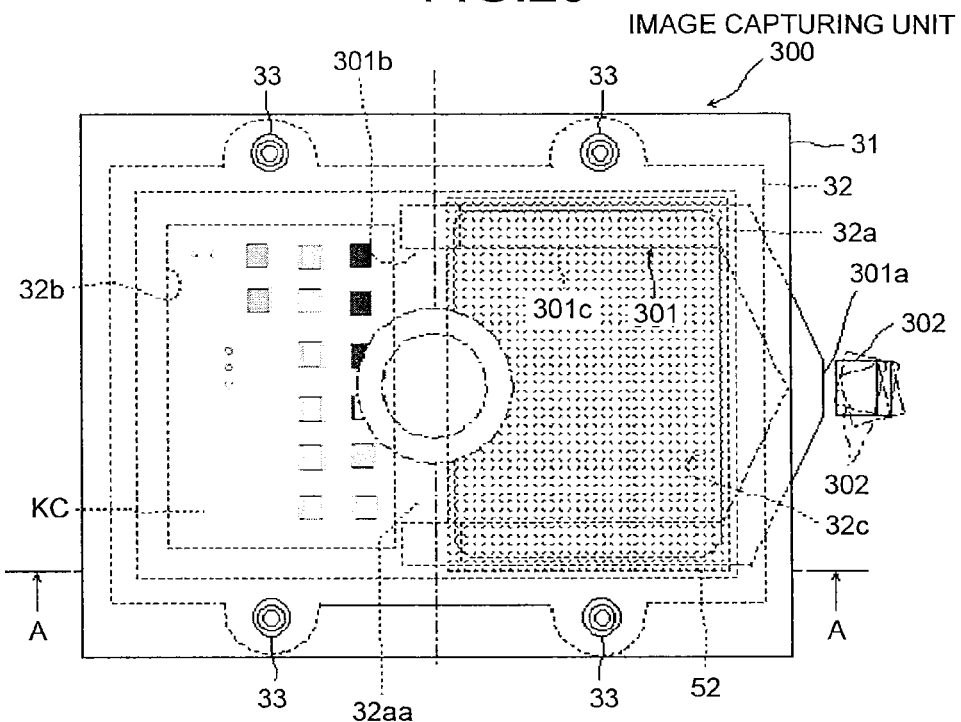
FIG. 29 is a plan view of an image capturing unit of a second embodiment.
Figure 30:
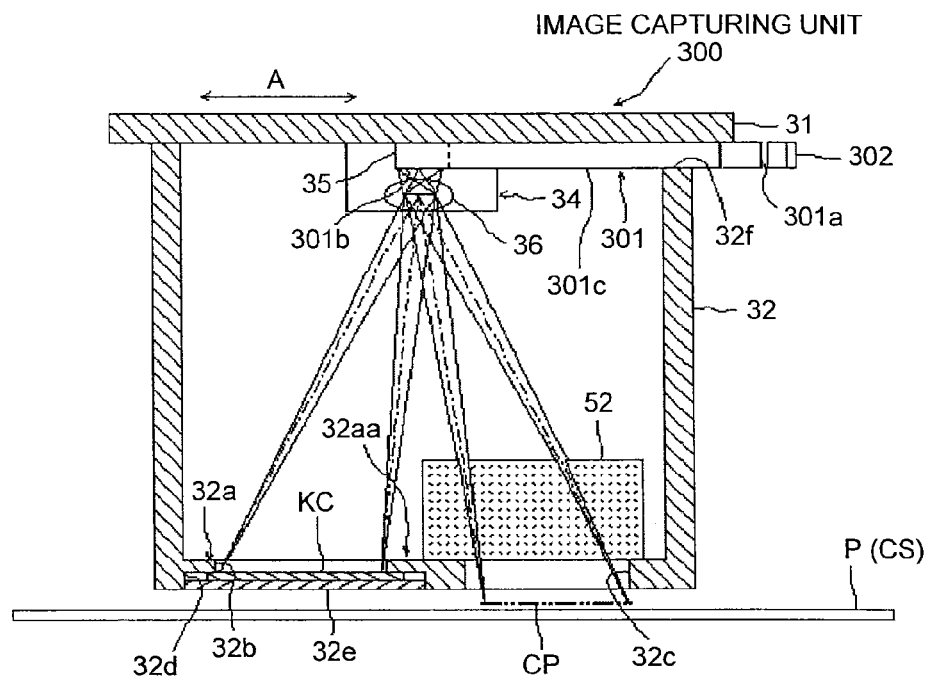
FIG. 30 is a cross-sectional view taken in the direction of arrow A-A of the image capturing unit of FIG. 29.

FIG. 29 to FIG. 34 are views illustrating a second embodiment of the image capturing unit, the color measuring device, the image forming device, the color measuring system, and the color measuring method of the present invention. FIG. 29 is a plan view of an image capturing unit 300 mounted on an image forming device applied with the second embodiment of the image capturing unit, the color measuring device, the image forming device, the color measuring system, and the color measuring method of the present invention. FIG. 30 is a cross-sectional view taken in the direction of arrow A-A of FIG. 29. The present embodiment is applied to the image forming device similar to the image forming device of the first embodiment. Furthermore, application is made to the image capturing unit 300 similar to the image capturing unit 30 illustrated in FIG. 4 and FIG. 8. In the description of the present embodiment, the same reference numerals are denoted on the configuring portions similar to the first embodiment, and hence the same reference numerals are used without illustrating illustration and the description thereof will be omitted or simplified.

Figure 31:
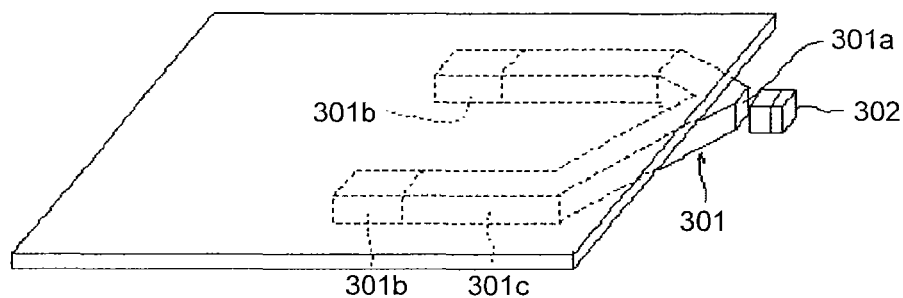
FIG. 31 is a perspective view of a substrate and a light guiding body of the image capturing unit of FIG. 29.

In FIG. 29 to FIG. 31, the image capturing unit 300 is attached to the carriage 6 of the image forming device 1. The image capturing unit 300 captures an image of a subject to perform color measurement on the subject (object to be performed with color measurement) at the time of color adjustment processing, similar to the image capturing unit 30 and the like of the first embodiment.

The image capturing unit 300 has the image sensor section 34 arranged at a central part of the surface on the frame body 32 side of the substrate 31. Similar to the above, the image sensor section (sensor section) 34 includes the two-dimensional image sensor 35 such as the CCD sensor, the CMOS sensor, and the like, and the lens 36.

In the image capturing unit 300, the frame body 32 is attached to the carriage 6 with the lower surface of the bottom surface portion (opposing surface) 32a on the side opposite to the substrate 31 facing the recording medium P on the platen 14 with a predetermined spacing d. The bottom surface portion 32a is formed with substantially rectangular opening 32b and opening 32c in the main-scanning direction, with a center line Lo as a center, with a bottom surface portion 32aa for absorbing mirror reflection of a predetermined width in between. The bottom surface portion 32aa may be performed with predetermined surface treatment and the like to absorb the mirror reflection.

As described above, the opening 32c is used to image the reference color patch KP of the reference sheet KS and the color measurement adjustment color patch CP of the color measurement adjustment sheet CS to be imaged (subject) formed on the recording medium P.

The opening 32b is formed with a recess 32d of a predetermined width along the periphery of the opening 32b on the surface on the recording medium P side, and the reference chart KC is removably set in the recess. The holding plate 32e held in the recess 32d of the reference chart KC while covering the surface on the recording medium P side of the reference chart KC is removably attached to the recess 32d of the opening 32b of the frame body 32. The opening 32b is closed by the reference chart KC and the holding plate 32e. The holding plate 32e has the surface on the recording medium P side formed to a smooth flat surface. The reference chart KC is as described above. Similar to the image capturing unit 50 illustrated in FIG. 19 to FIG. 21, the image capturing unit 300 includes the optical path length changing member 52 having an index of refraction n on the optical path of the recording medium P and the two-dimensional image sensor 35 through the opening 32c with the opening 32c closed.

The image capturing unit 300 has a light guiding body 301 arranged on the surface on the frame body 32 side of the substrate 31. The light guiding body 301 guides the illumination light exit from one illumination light source 302 arranged exterior to the frame body 32 into the frame body 32. The light guiding body 301 includes one incident port 301a, which is positioned outside the frame body 32, a pair of exit ports 301b, which are opened toward the bottom surface portion 32a at positions spaced apart at equal interval by a predetermined amount in the sub-scanning direction from the center of the image sensor section 34 on the center line Lo in the sub-scanning direction passing through the center of the image sensor section 34, and a light guiding portion 301c for connecting the incident port 301a and the exit ports 301b. The light guiding portion 301c is branched into two from the position near the incident port 301a, and respectively connected to the pair of exit ports 301b. In other words, the exit port 301b of the light guiding body 301 exits the illumination light with the mirror reflection region SA positioned on the bottom surface portion 32aa deviated from the reference color patch KP of the reference sheet KS, the color measurement adjustment color patch CP of the color measurement adjustment sheet CS, and the reference chart KC serving as the subject through the opening 32c.

The light guiding body 301 is configured with a member having satisfactory light guiding performance such as an optical fiber, and the like. The light guiding portion 301c other than the incident port 301a and the exit ports 301b is formed with the light shielding member or performed with the light shielding processing to prevent the leakage of light to the outside and entering of light from the outside.

The image capturing unit 300 includes the illumination light source (light source member) 302 at a position facing the incident port 301a of the light guiding body 301. LED and the like, for example, is used for the illumination light source 302. The type of light source (illumination light source 37, 302) is not limited to the LED. For example, organic EL, and the like may be used for the light source. If the organic EL is used for the light source, an illumination light close to the spectral distribution of a solar light is obtained, and thus improvement in color measurement accuracy can be expected. As illustrated with an arrow in FIG. 30, the illumination light source 302 is attached to a supporting member (not illustrated) in a manner the incident angle of the illumination light to the incident port 301a can be adjusted so that the illumination light of the same light quantity can be exit from the pair of exit ports 301b.

The light guiding body 301 guides the illumination light that entered from the incident port 301a to the exit ports 301b through the light guiding portion 301c, and exits the illumination light toward the bottom surface portion 32a of the frame body 32 from the exit port 301b.

A recess 32f, through which the light guiding portion 301c of the light guiding body 301 can be passed, is formed at an upper end face of the frame body 32. The light guiding body 301 is arranged with the light guiding portion 301c passing between the recess 32f and the substrate 31. The recess 32f of the frame body 32 through which the light guiding portion 301c passes may include the light shielding member (not illustrated) for preventing the entering of external light into the frame body 32 between the recess 32f and the substrate 31.

In FIG. 29 to FIG. 31, the light guiding body 301 is passed through the recess 32f formed on the side surface of the frame body 32 so that the light guiding body 301 is drawn into the frame body 32 from outside the frame body 32, and attached to the surface on the frame body 32 side of the substrate 31. The light guiding body 301 is arranged with the exit ports 301b opened at immediately above the bottom surface portion 32a between the opening 32b where the reference chart KC is arranged and the opening 32c on the center line Lo. The arrangement configuration of the light guiding body 301 is not limited to the arrangement configuration described above.

Figure 32:
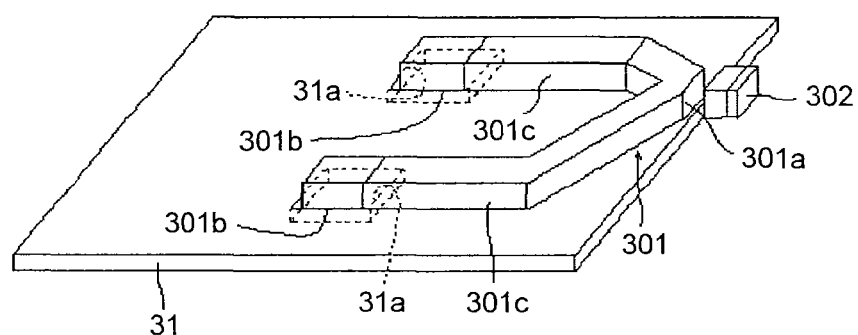
FIG. 32 is a perspective view illustrating another example of an arrangement configuration of the light guiding body.

For example, as illustrated in FIG. 32, the image capturing unit 300 may be formed with a pair of illumination windows 31a on the substrate 31 at symmetrical positions with the image sensor section 34 in between at immediately above the bottom surface portion 32aa between the opening 32b where the reference chart KC is arranged and the opening 32c on the center line Lo, and arranged with the light guiding body 301 having the exit port 301b positioned at the illumination window 31a laying over the upper surface of the substrate 31. In this case, the light guiding body is positioned on the upper surface, which is the surface opposite to the frame body 32 of the substrate 31, so that the incident light from the illumination light source 302 arranged at the portion of the incident port 301a is taken in from the incident port 301a and irradiated into the frame body 32 from the exit ports 301b through the illumination window 31a of the substrate 31. In this case, in the light guiding body 301, the exit ports 301b is arranged such that the light exits under the condition that the mirror reflection region SA of the illumination light acts as the bottom surface portion 32aa.

Figure 33:
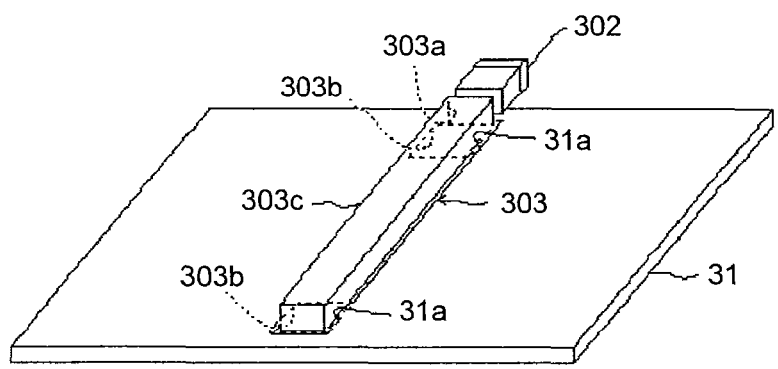
FIG. 33 is a perspective view illustrating another further example of the arrangement configuration of the light guiding body.

Furthermore, the light guiding body 301 is not limited to a shape in which the incident port 301a and the pair of exit ports 301b are connected with the light guiding portion 301c branched into two. For example, as illustrated in FIG. 33, a light guiding body 303 formed to a linear shape on the center line Lo may be adopted. In this case, the image capturing unit 300 is formed with a pair of illumination windows 31a on the substrate 31 at symmetrical positions with the image sensor section 34 in between at immediately above the bottom surface portion between the opening 32b where the reference chart KC is arranged and the opening 32c on the center line Lo. It is arranged with a pair of exit ports 303b, formed on the surface on the substrate side at positions of both ends of the linear light guiding body 303, positioned in the illumination window 31a, and the pair of exit ports 303b are connected with the light guiding portion 303c. The light guiding body 303 includes an incident port 303a at an end face on one side in a longitudinal direction. The illumination light source 302 is arranged at a position facing the incident port 303a. The light guiding body 303 has a function of evenly dividing the illumination light that entered from the illumination light source 302 to the incident port 303a to the pair of exit ports 303b formed at both ends in the longitudinal direction, and exiting the illumination light from the exit ports 303b. The light guiding body 303 illuminates the evenly divided illumination light into the frame body 32 through the illumination window 31a formed in the substrate 31. In this case, in the light guiding body 303, the exit ports 303b is arranged such that the light exits under the condition that the mirror reflection region SA of the illumination light acts as the bottom surface portion 32aa.

Figure 34:
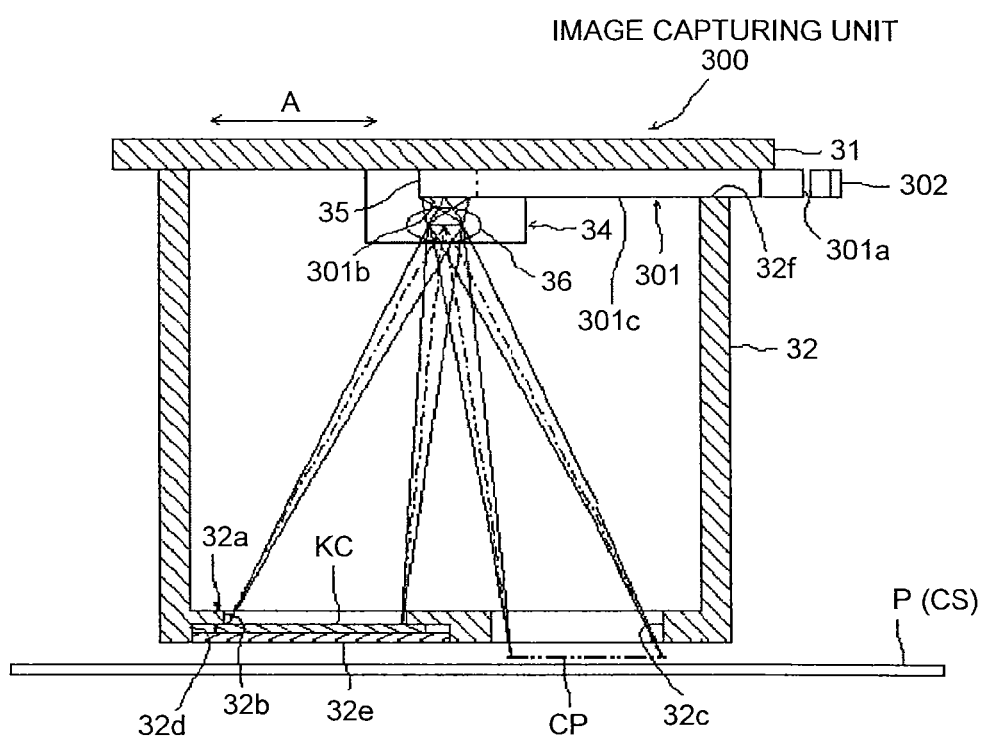
FIG. 34 is a front cross-sectional view of the image capturing unit in which the optical path length changing member is not arranged.

Furthermore, in the description made above, the image capturing unit 300 includes the optical path length changing member 52 in the frame body 32 while blocking the opening 32c, but the optical path length changing member 52 may not be arranged, as illustrated in FIG. 34, if the distance difference of the subject and the reference chart KC imaged through the opening 32c is within a focal depth of the lens 36.

Similar to the image capturing units 30, 50 of the first embodiment, the image capturing unit 300 of the present embodiment is used to capture the image of the reference chart KC and the subject when performing the color measurement processing at an appropriate timing.

The image capturing unit 300 has the exit ports 301b, 303b of the light guiding body 301, 303 positioned immediately above the bottom surface portion 32aa having a wider width than the mirror reflection region SA of the illumination light from the exit ports 301b, 303b, and is arranged at the position where the reference chart KC and the subject are illuminated under the same illumination condition. The light guiding body 301, 303 evenly divides the illumination light exit from one illumination light source 302 to the exit ports 301b, 303b, and irradiates the reference chart KC and the subject from the exit ports 301b, 303b.

Therefore, in the image forming device 1 of the present embodiment, the image capturing unit 300 includes one illumination light source (light source member) 302 that exits the illumination light as the illumination light source, and the light guiding body 301 that guides the illumination light emitted from the illumination light source 302, the light guiding body 301 including the incident port 301a that takes in the illumination light emitted from the illumination light source 302, the exit ports 301b arranged at positions where the reflected light entering the image sensor section 34 among the reflected light of the illumination light on the subject and the reference chart KC becomes the mirror reflection region SA to exit the illumination light, and the light guiding portion 301c that connects the incident port 301a and the exit ports 301b to guide the illumination light entered from the incident port 301a to the exit ports 301b while preventing the illumination light from leaking to the outside.

Therefore, the image capturing unit 300 can illuminate the reference chart KC and the subject to capture images while preventing mirror reflection under the same illumination condition using the light guiding body 301, 303, and can capture the image at higher accuracy with a simple configuration to perform the color measurement of high accuracy.

The light guiding body 301 of the image capturing unit 300 has one incident port 301a arranged such that the illumination light emitted from the illumination light source 302 is taken, the pair of exit ports 30b arranged such that the illumination light exits to positions symmetric in the length direction with respect to the center in the length direction of the bottom surface portion 32aa, which is the intermediate region having a predetermined length with the image capturing region of the subject and the image capturing region of the reference chart KC through the opening 32c, and the light guiding portion 301c connecting to the incident port 301a, being divided in the middle, and connecting to the pair of exit ports 301b.

Therefore, the illumination light from one illumination light source 302 can be illuminated on the subject and the reference chart KC in a state closer to the same illumination condition, so that the color measurement of higher accuracy can be performed.

The image capturing unit 300 of the present embodiment can be applied similar to the above to the image forming system 200 of the embodiment described above.

According to the present invention, the subject and the color reference chart can always be imaged in a stable position relationship.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing apparatus comprising:
    a sensor that images a predetermined range including a subject;
    a reference chart that is imaged by the sensor with the subject; and
    an illumination light source that illuminates the subject and the reference chart, wherein
    a direction from the illumination light source to a side of the sensor extends through an intermediate region; and
    the intermediate region is positioned between an image capturing region of the subject through an opening and an image capturing region of the reference chart.

2. The image capturing apparatus according to claim 1, further comprising a frame having the opening, wherein
    the sensor images, via the opening, the subject located outside the frame, and
    the illumination light source is arranged at a position where a mirror reflection region overlaps the intermediate region.

3. The image capturing apparatus according to claim 2, wherein the illumination light source is arranged in a pair at positions symmetric in a length direction with respect to a center in the length direction of the intermediate region having a predetermined length.

4. The image capturing apparatus according to claim 1, wherein
    the illumination light source is arranged at a position spaced apart by a predetermined distance in a perpendicular direction toward an opposing surface side, which faces the subject, from the sensor in a state of emitting an irradiation light in a direction of the opposing surface side, and
    the image capturing apparatus further includes a light shielding member that shields entering of mirror reflection light of illumination light emitted from the illumination light source to the sensor.

5. The image capturing apparatus according to claim 4, wherein the illumination light source is attached to a surface on the opposing surface side of the light shielding member.

6. The image capturing apparatus according to claim 1, wherein
    the illumination light source includes one light source member that emits illumination light, and a light guiding body that guides the illumination light emitted from the light source member, and
    the light guiding body includes
        an incident port that takes in the illumination light emitted from the light source member;
        an exit port that is arranged at a position where reflected light entering the sensor among the reflected light of the irradiation light to the subject and the reference chart is outside a mirror reflection region and that exits the illumination light; and
        a light guiding member that connects the incident port and the exit port to guide the illumination light entered from the incident port to the exit port while preventing the illumination light from leaking to outside.

7. The image capturing apparatus according to claim 6, wherein
    a single incident port is arranged such that the illumination light emitted from the light source member is taken,
    a pair of exit ports is arranged such that the illumination light exits to positions symmetric in a length direction with respect to a center in the length direction of the intermediate region having a predetermined length, and
    the light guiding member connects to the incident port and is branched in the middle to connect to the pair of exit ports.

8. A color measuring device comprising:
    the image capturing apparatus according to claim 1; and
    a calculating device that calculates a color measurement value of the subject based on imaged data of the subject and the reference chart imaged by the image capturing apparatus.

9. An image forming device comprising:
    the color measuring device according to claim 8; and
    an image forming device that forms an image using image data having been subjected to color adjustment based on a color measurement value, which is obtained by performing color measurement with the color measuring device.

10. A color measuring system comprising:
  the image capturing apparatus according to claim 1;
  a calculating device that calculates a color measurement value of the subject based on imaged data of the subject and the reference chart imaged with the image capturing apparatus; and
  an interface that connects the image capturing apparatus and the calculating device.

11. A color measuring method executed by a color measuring device including the image capturing apparatus according to claim 1, and a calculating device, the color measuring method comprising:
  simultaneously imaging a reference chart including a plurality of colors and a subject with the image capturing apparatus; and
  calculating a color measurement value of the subject with the calculating device based on imaged data of the subject and the reference chart imaged by the image capturing apparatus.

* * * * *